United States Patent
Endo et al.

(10) Patent No.: US 9,965,970 B2
(45) Date of Patent: May 8, 2018

(54) EDUCATIONAL TACTILE SENSATION PROVIDING APPARATUS AND SYSTEM

(71) Applicant: FUJITSU LIMITED, Kawasaki-shi, Kanagawa (JP)

(72) Inventors: Yasuhiro Endo, Ebina (JP); Yuichi Kamata, Isehara (JP); Kiyoshi Taninaka, Ebina (JP); Akinori Miyamoto, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/216,381

(22) Filed: Jul. 21, 2016

(65) Prior Publication Data

US 2016/0328985 A1    Nov. 10, 2016

Related U.S. Application Data

(63) Continuation of application No. PCT/JP2014/053463, filed on Feb. 14, 2014.

(51) Int. Cl.
*G09G 5/00*     (2006.01)
*G09B 5/12*     (2006.01)
(Continued)

(52) U.S. Cl.
CPC ............. *G09B 5/125* (2013.01); *G06F 3/016* (2013.01); *G06F 3/041* (2013.01); *G06F 3/044* (2013.01);
(Continued)

(58) Field of Classification Search
CPC ....... G09B 5/125; G09B 21/003; G06F 3/016; G06F 3/044; G06F 3/0412; G06F 3/0488;
(Continued)

(56) References Cited

U.S. PATENT DOCUMENTS 9,400,571 B2    7/2016 Kamata et al.
2010/0231541 A1    9/2010 Cruz-Hernandez et al.
(Continued)

FOREIGN PATENT DOCUMENTS

JP    2003-078971    3/2003
JP    2007-115157    5/2007
(Continued)

OTHER PUBLICATIONS

English Abstract for Japanese Publication No. 2012-221179, published Nov. 12, 2012.
(Continued)

*Primary Examiner* — Jennifer Nguyen
(74) *Attorney, Agent, or Firm* — Staas & Halsey LLP

(57) ABSTRACT

An educational tactile sensation providing apparatus includes a top panel having a manipulation input surface; a position detector configured to detect a position of a manipulation input performed on the manipulation input surface; a display part disposed on a back face side of the top panel; a first vibrating element configured to generate a vibration in the manipulation input surface of the top panel; a memory configured to store tactile sensation data in which an image of a target tangible object is associated with positions in the image and amplitudes corresponding to tactile sensations of the target tangible object at the respective positions; and a drive controlling part configured to adjust an amplitude of a driving signal based on the position of the manipulation input performed on the manipulation input surface and a position among the positions in the image included in the tactile sensation data.

12 Claims, 22 Drawing Sheets

(51) Int. Cl.
*G06F 3/0488* (2013.01)
*G06F 3/01* (2006.01)
*G06F 3/041* (2006.01)
*G06F 3/044* (2006.01)
*G09B 21/00* (2006.01)

(52) U.S. Cl.
CPC .......... *G06F 3/0412* (2013.01); *G06F 3/0416* (2013.01); *G06F 3/0488* (2013.01); *G06F 3/04886* (2013.01); *G06F 2203/04103* (2013.01); *G06F 2203/04809* (2013.01); *G09B 21/003* (2013.01)

(58) Field of Classification Search
CPC .... G06F 3/041; G06F 3/0416; G06F 3/04886; G06F 2203/04103; G06F 2203/04809
USPC .................................. 345/173–178; 715/863
See application file for complete search history.

(56) References Cited

U.S. PATENT DOCUMENTS

| | | | |
|---|---|---|---|
| 2011/0291976 A1 | 12/2011 | Takada et al. | |
| 2012/0206390 A1* | 8/2012 | Ueno | G06F 3/016 345/173 |
| 2012/0256858 A1 | 10/2012 | Sudo | |
| 2013/0120290 A1 | 5/2013 | Yumiki et al. | |
| 2016/0034057 A1 | 2/2016 | Ikeda et al. | |
| 2017/0192510 A1* | 7/2017 | Ullrich | G06F 3/016 |

FOREIGN PATENT DOCUMENTS

| | | |
|---|---|---|
| JP | 2010-231609 | 10/2010 |
| JP | 2010-238222 | 10/2010 |
| JP | 2012-520137 | 9/2012 |
| JP | 2012-221179 | 11/2012 |
| JP | 2013-122750 | 6/2013 |
| JP | 2013-242803 | 12/2013 |
| WO | WO 2013/186843 A1 | 12/2013 |

OTHER PUBLICATIONS

Espacenet Bibliographic Data, Japanese Publication No. 2010-238222, published Oct. 21, 2010.
English Abstract for Japanese Publication No. 2012-520137, published Sep. 6, 2012 from WO 2010/105012 published Sep. 16, 2010.
Patent Abstracts of Japan, Publication No. 2013-122750, published Jun. 20, 2013.
Patent Abstracts of Japan, Publication No. 2007-115157, published May 10, 2007.
Espacenet Bibliographic Data, Japanese Publication No. 2010-231609, published Oct. 14, 2010.
Dohda et al., "The Printed-matter Typecasting Method for Haptic Feel Design and Sticky-band Illusion", The Collection of Papers of the 11th SICE System Integration Division Annual Conference (SI2010, Sendai), Dec. 2010, pp. 174 to 177.
Nakatani et al., "The Fishbone Tactile Illusion", Collection of papers of the 10th Congress of the Virtual Reality Society of Japan, Sep. 2005 (5 pages).
International Search Report dated May 20, 2014 in corresponding International Application No. PCT/JP2014/053463.
Written Opinion of the International Searching Authority dated May 20, 2014 in corresponding International Application No. PCT/JP2014/053463.
Patent Abstracts of Japan, Publication No. 2003-078971, published Mar. 14, 2003.
Patent Abstracts of Japan, Publication No. 2013-242803, published Dec. 5, 2013.
Kumiko Kishiyama, Development of the tactile-visual display which can be displayed interactively (Online, https://shingi.jst.go.jp/past_abst/abst/p/11/1114/tmu7.pdf, search date: Sep. 26, 2017), Jul. 1, 2011.
Japanese Office Action in Application No. 2015-562641, dated Oct. 3, 2017.

* cited by examiner

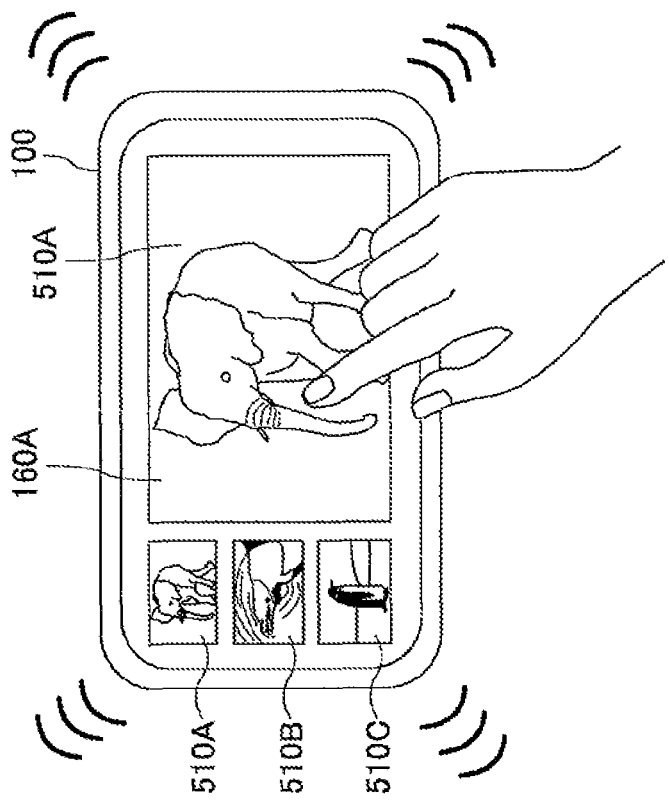
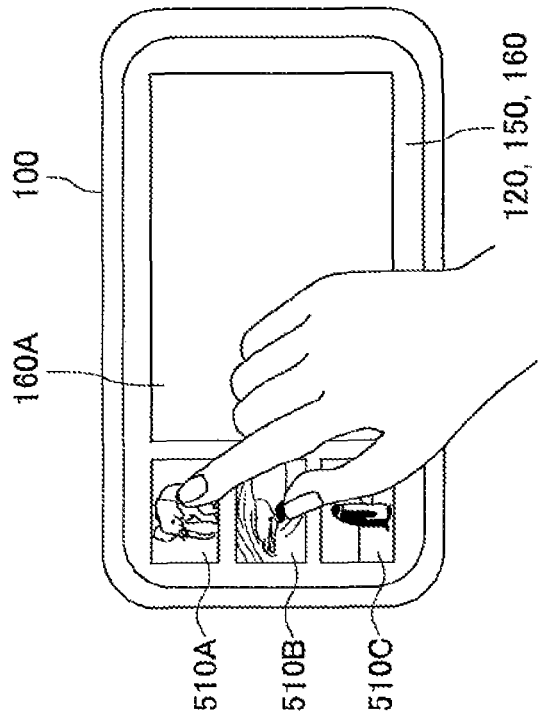

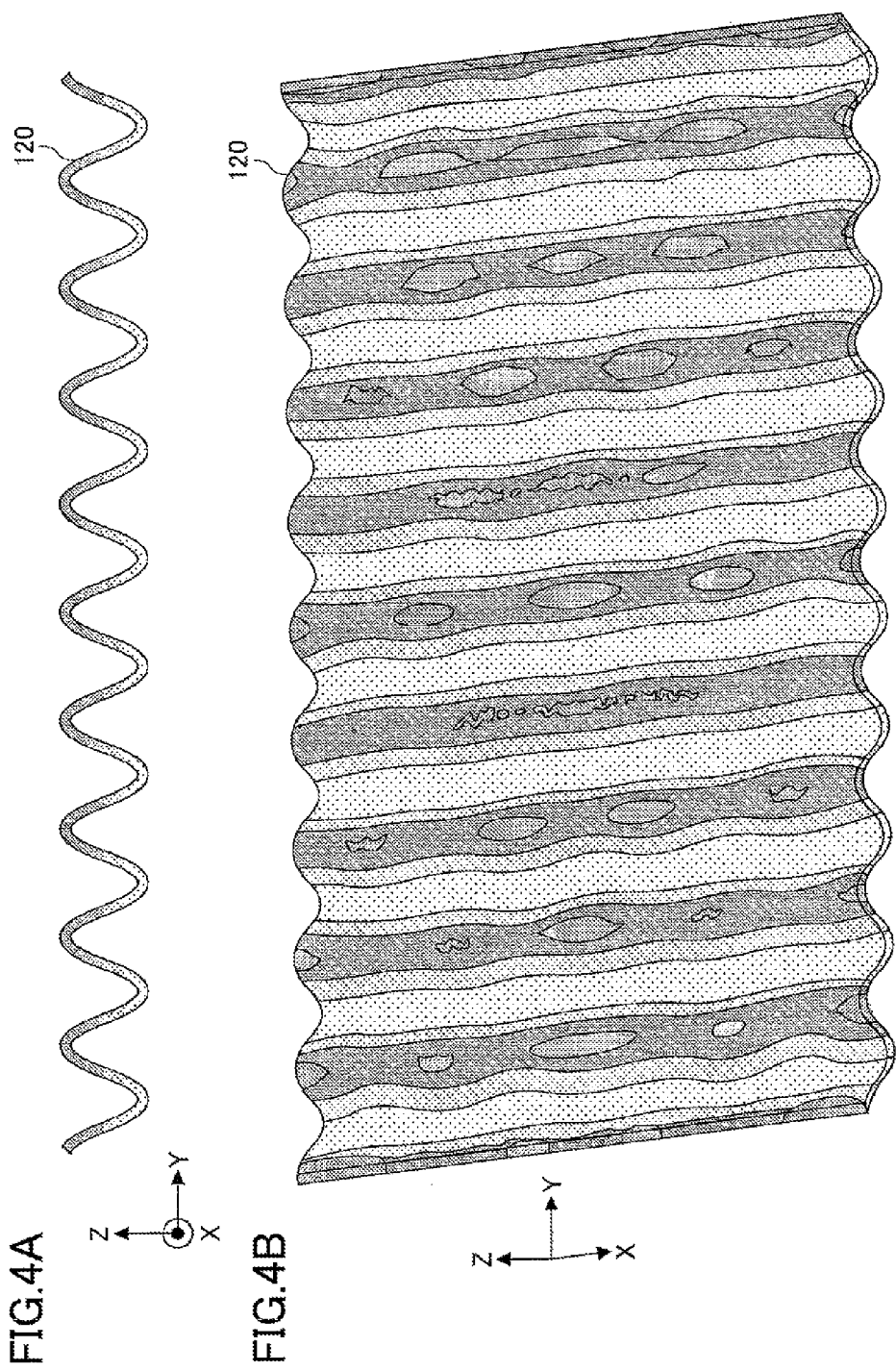

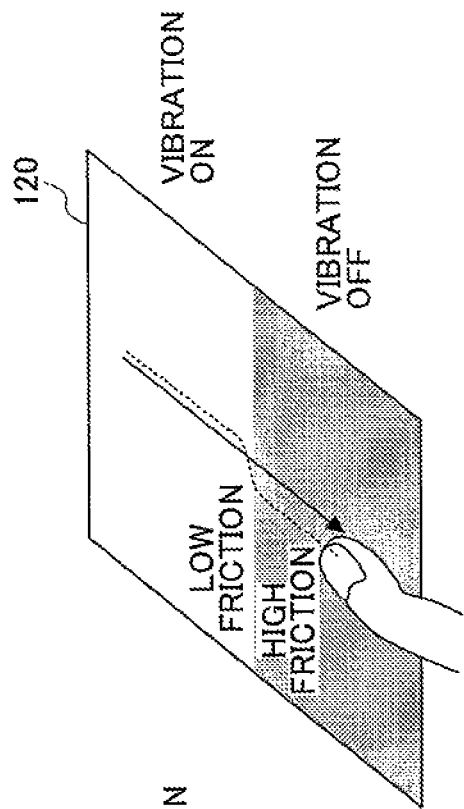
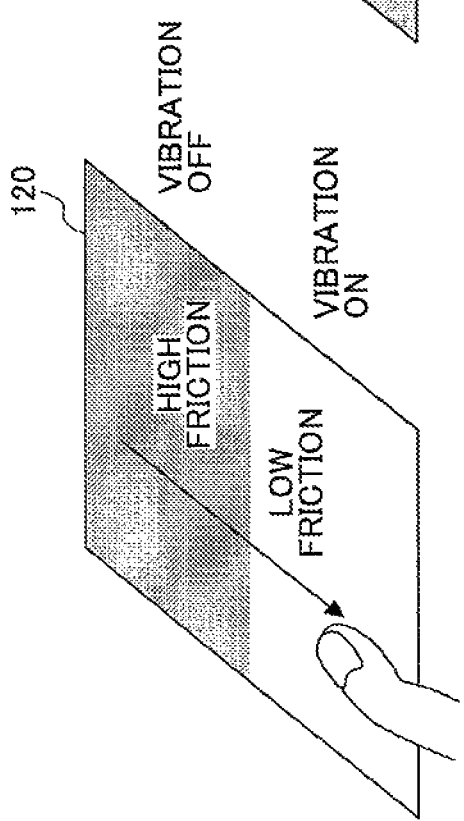

FIG.7A

| ID | IMAGE DATA | COORDINATE DATA | AMPLITUDE DATA |
|---|---|---|---|
| 001 | I001 | f1=(X,Y) | A1=(X,Y) |
| 002 | I002 | f2=(X,Y) | A2=(X,Y) |
| 003 | I003 | f3=(X,Y) | A3=(X,Y) |
| 004 | I004 | f4=(X,Y) | A4=(X,Y) |
| ⋮ | ⋮ | ⋮ | ⋮ |

FIG.7B

| MOVING SPEED | AMPLIFICATION FACTOR |
|---|---|
| $0 \leq V < b1$ | 0 |
| $b1 \leq V < b2$ | G1 |
| $b2 \leq V < b3$ | G2 |
| | |

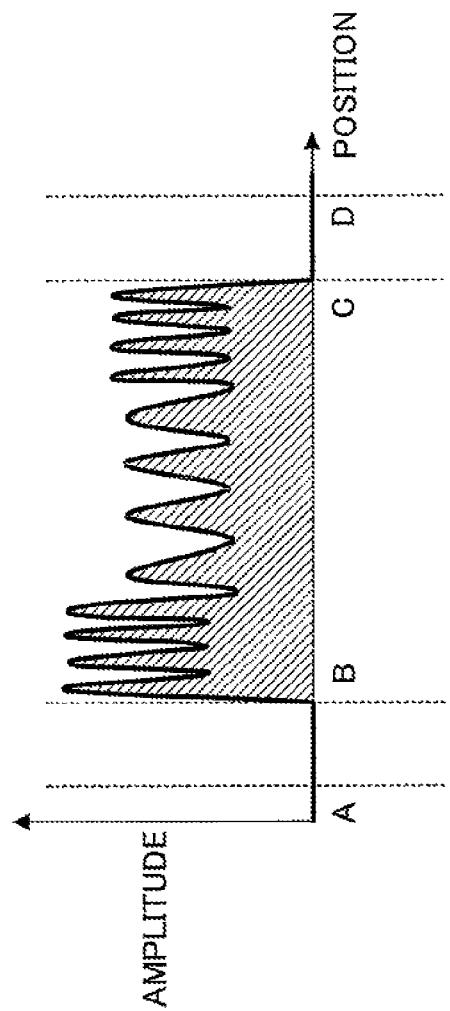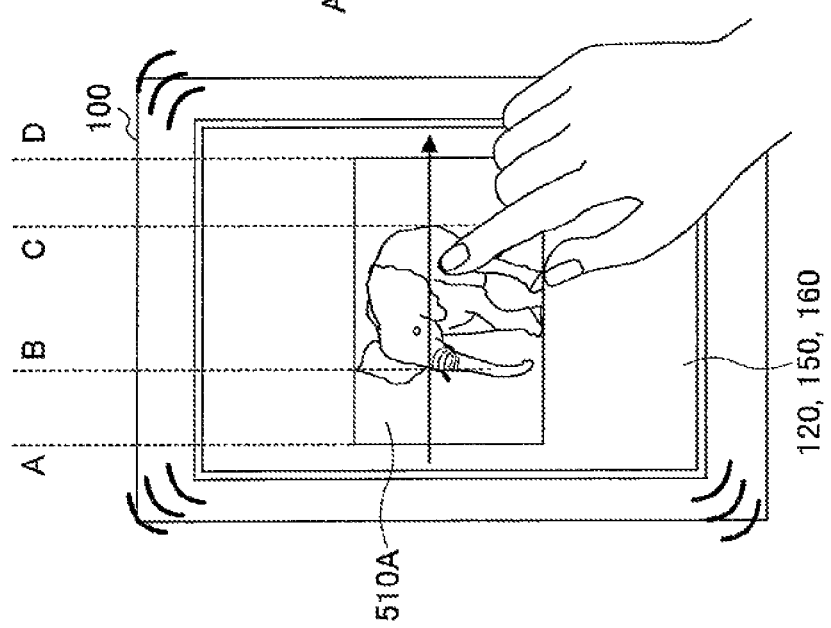

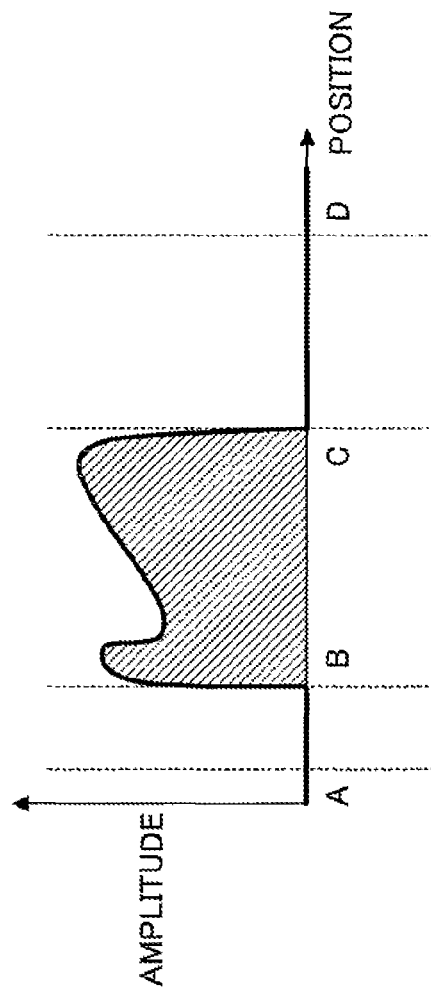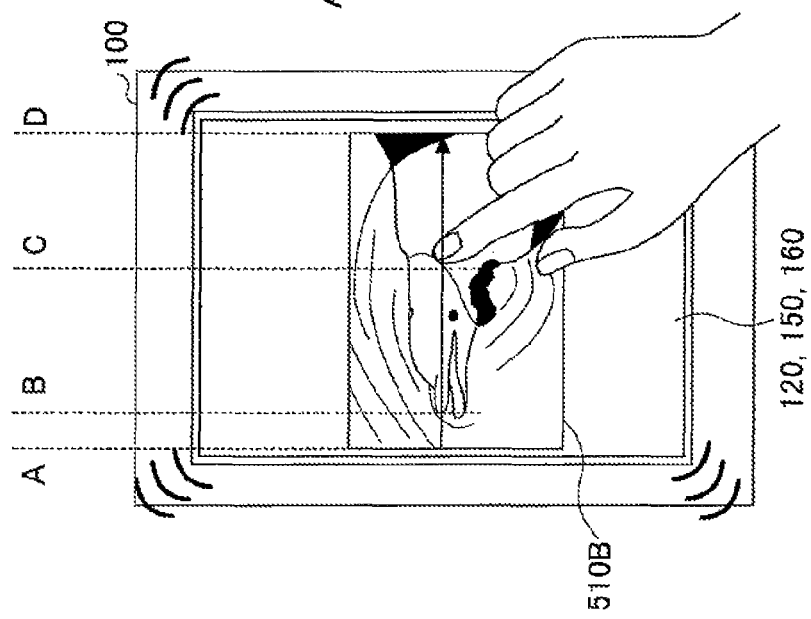

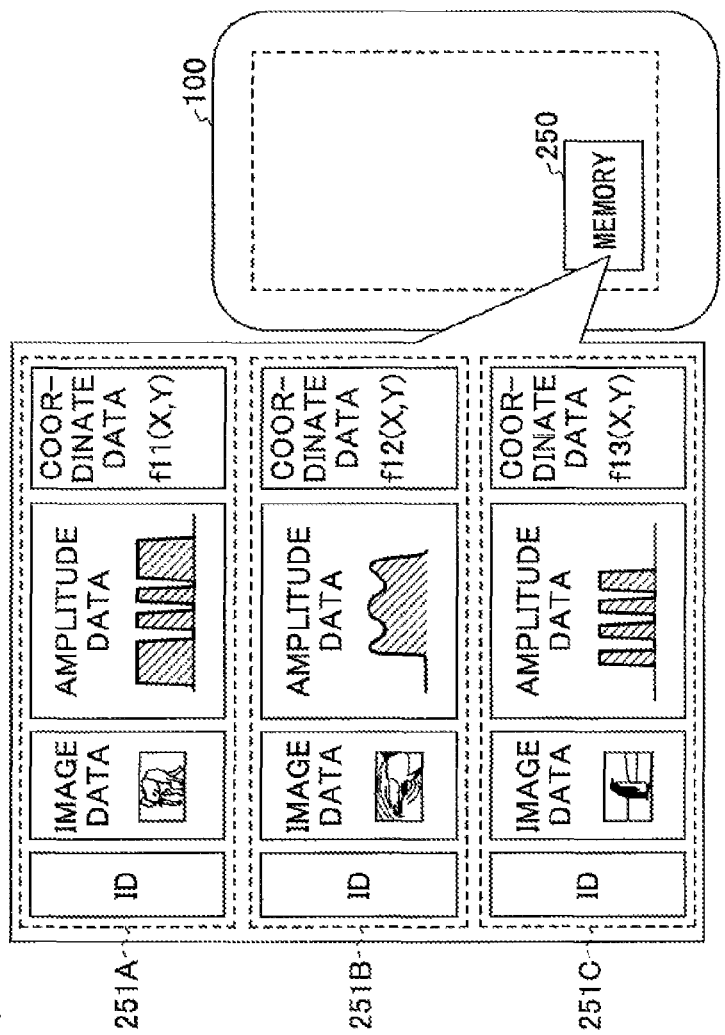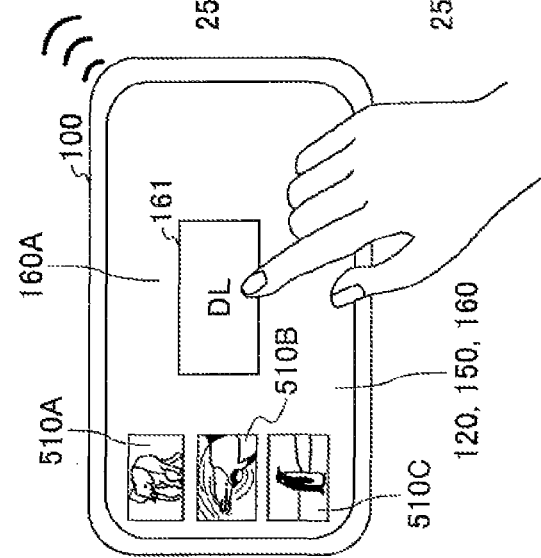

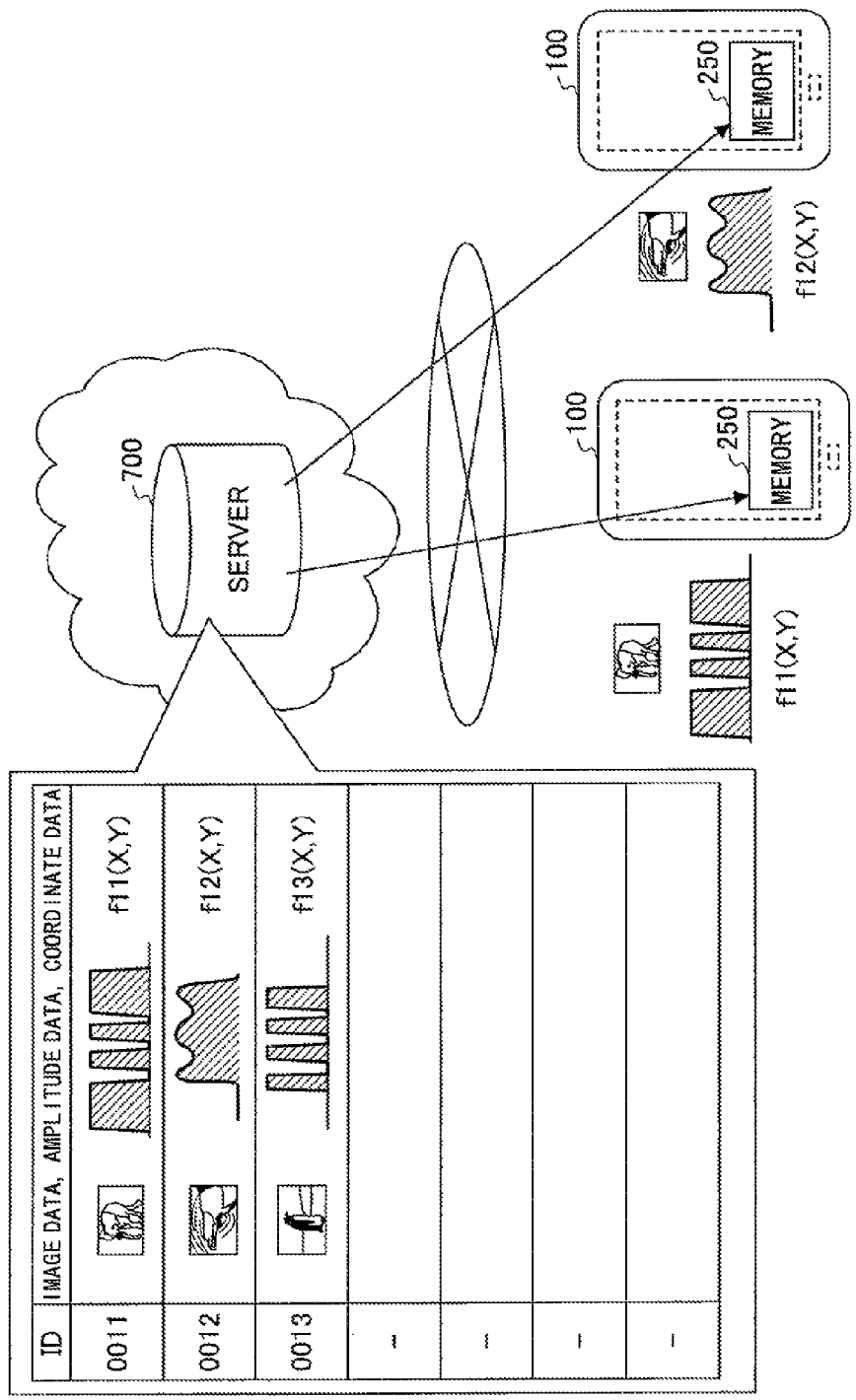

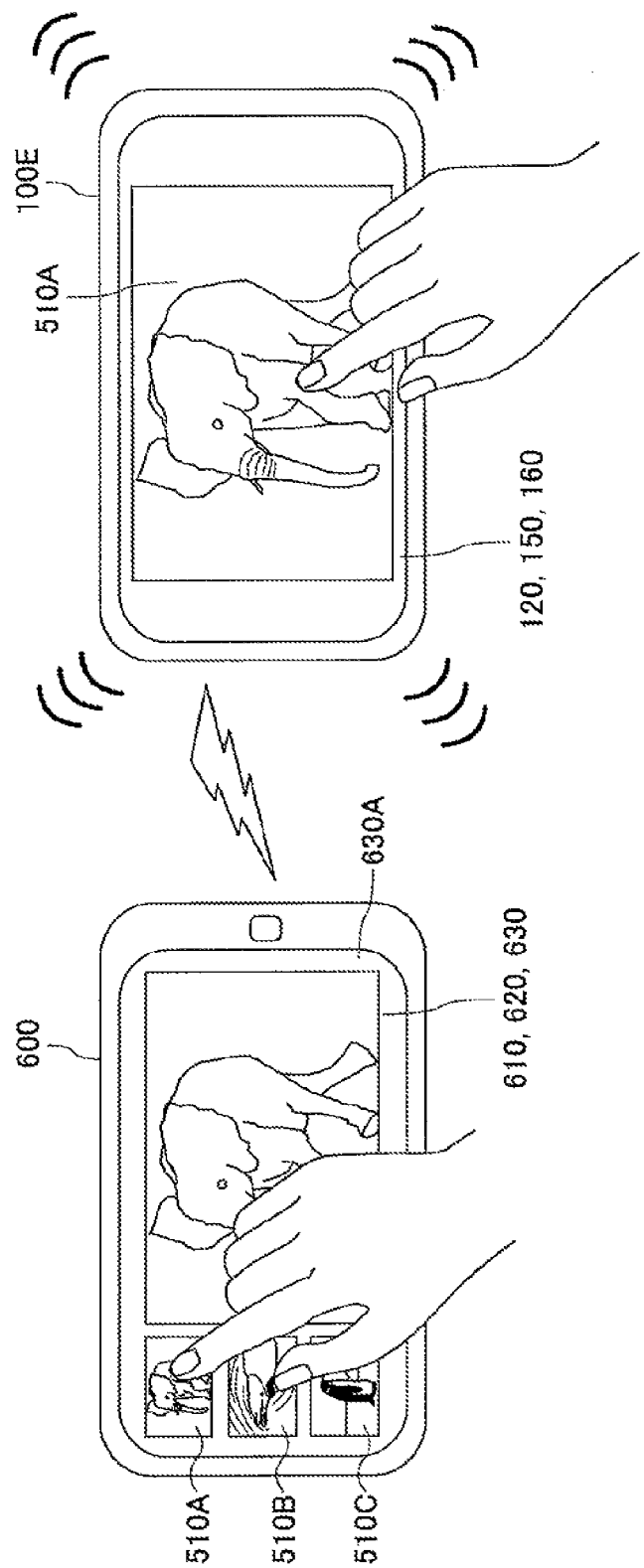

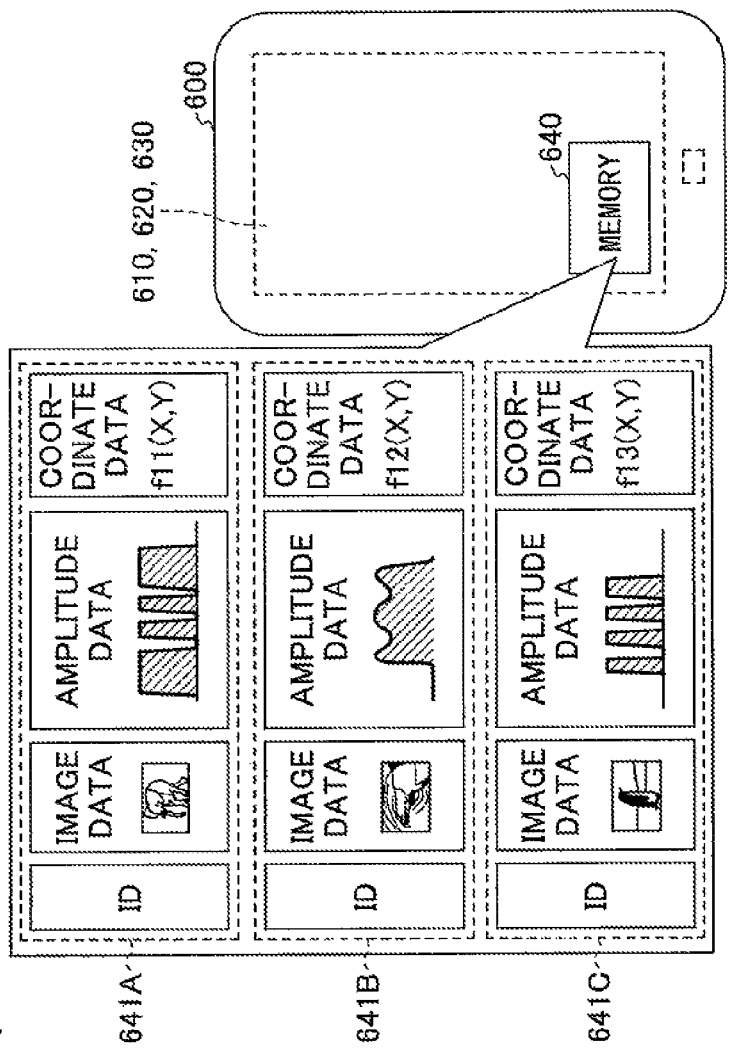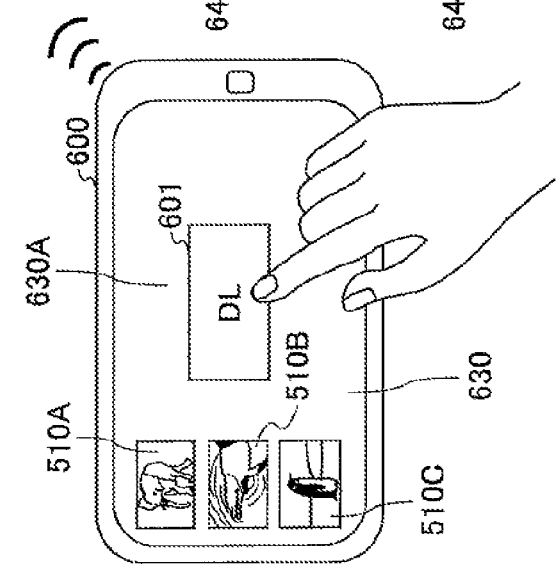

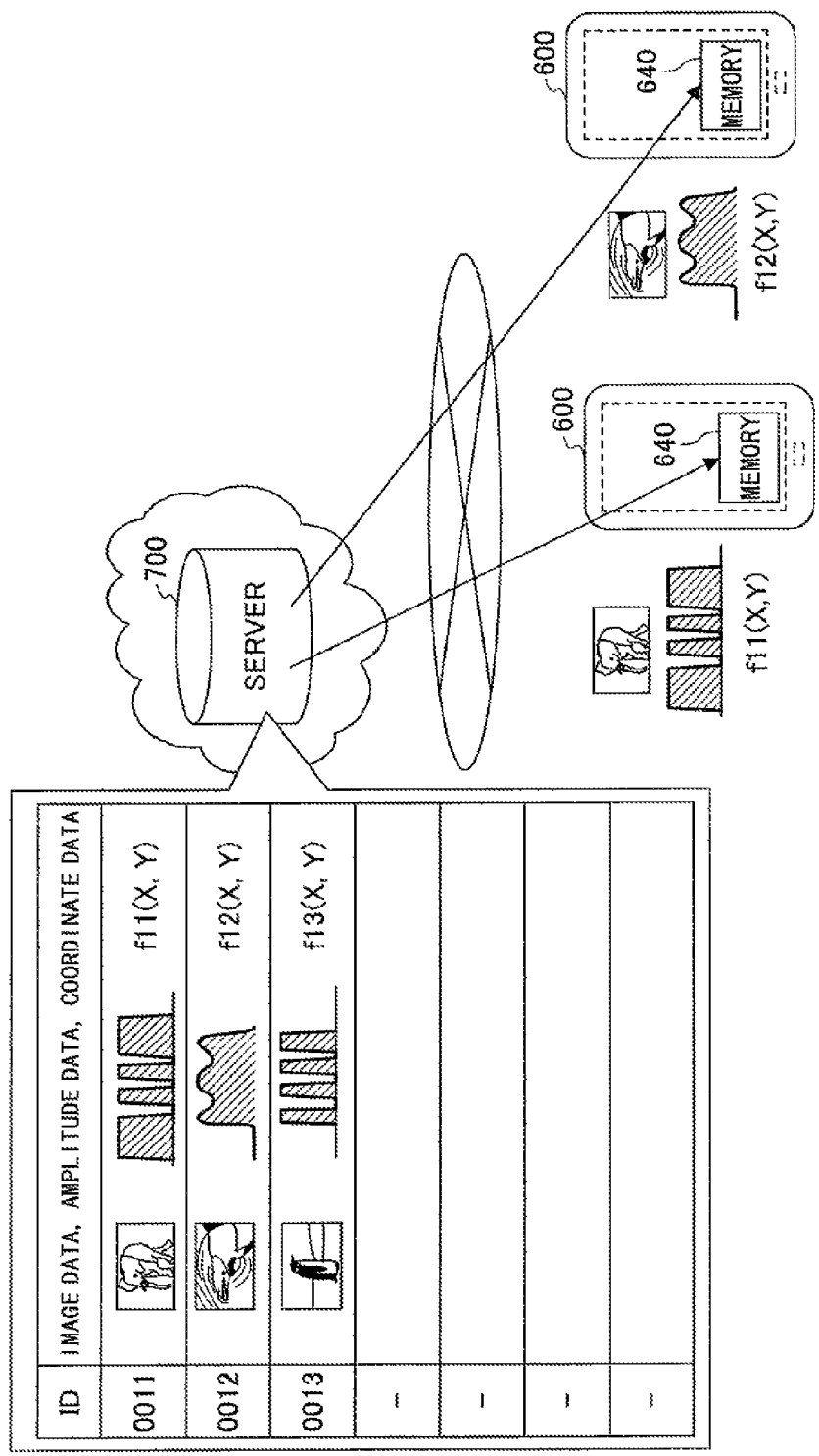

EDUCATIONAL TACTILE SENSATION PROVIDING APPARATUS AND SYSTEM

CROSS-REFERENCE TO RELATED APPLICATION

This application is a continuation application of International Application PCT/JP2014/053463 filed on Feb. 14, 2014 and designated the U.S., the entire contents of which are incorporated herein by reference.

FIELD

The embodiments discussed herein relate to an educational tactile sensation providing apparatus and a system.

BACKGROUND

A tactile sensation producing apparatus is known in the related art which includes a display, a contact detector that detects a contact state of user's manipulation to the display and a haptic vibration generating part which generates haptic vibration that gives a designated sensation to the user's body-part contacting the display (for example, see Patent Document 1).

The tactile sensation producing apparatus further includes a vibration waveform data generating means which generates a waveform data based on a detected result of the contact detector. The waveform data is used to generate the haptic vibration. The tactile sensation producing apparatus further includes an ultrasound modulating means which performs a modulating process on the waveform data, generated by the vibration waveform data generating means, by utilizing ultrasound as a carrier wave and outputs an ultrasound signal generated by the modulating process to the haptic vibration generating means as a signal used to generate the haptic vibration.

The ultrasound modulating means performs either a frequency modulation or a phase modulation. The ultrasound modulating means further performs an amplitude modulation.

However, an ultrasound frequency used in the conventional tactile sensation producing apparatus may be any frequency as long as the frequency is higher than that of an audio frequency (about 20 kHz). No specific setting is made for the ultrasound frequency. Accordingly, the tactile sensation producing apparatus does not provide a fine tactile sensation to the user.

RELATED-ART DOCUMENTS

Patent Documents

[Patent Document 1] Japanese Laid-open Patent Publication No. 2010-231609

SUMMARY

According to an aspect of the embodiments, an educational tactile sensation providing apparatus is for providing simulated tactile sensations of a target tangible object. The educational tactile sensation providing apparatus includes a top panel having a manipulation input surface; a position detector configured to detect a position of a manipulation input performed on the manipulation input surface to output a signal in accordance with the manipulation input; a display part disposed on a back face side of the top panel; a first vibrating element configured to generate a vibration in the manipulation input surface of the top panel; a memory configured to store tactile sensation data in which an image of the target tangible object is associated with positions in the image and amplitudes corresponding to the tactile sensations of the target tangible object at the respective positions; and a drive controlling part configured to drive the first vibrating element by using a driving signal causing the first vibrating element to generate a natural vibration in an ultrasound-frequency-band in the manipulation input surface. The drive controlling part adjusts an amplitude of the driving signal based on the position of the manipulation input performed on the manipulation input surface and a position among the positions in the image included in the tactile sensation data.

BRIEF DESCRIPTION OF DRAWINGS

FIG. 1A is a diagram illustrating a use mode of an educational tactile sensation providing apparatus according to a first embodiment;

FIG. 1B is a diagram illustrating the use mode of the educational tactile sensation providing apparatus according to the first embodiment;

FIG. 4A is a diagram illustrating crests and troughs of a standing wave formed in parallel with the short side of a top panel;

FIG. 4B is a diagram illustrating the crests and the troughs of the standing wave formed in parallel with the short side of the top panel;

FIG. 5A is a diagram illustrating a case where a kinetic friction force applied to a fingertip varies when a natural vibration at an ultrasound-frequency-band is generated in the top panel of the educational tactile sensation providing apparatus;

FIG. 5B is a diagram illustrating a case where the kinetic friction force applied to the fingertip varies when the natural vibration at the ultrasound-frequency-band is generated in the top panel of the educational tactile sensation providing apparatus;

FIG. 7A is a diagram illustrating data stored in a memory;

FIG. 7B is a diagram illustrating data stored in the memory;

FIG. 8A is a diagram illustrating driving patterns of the vibrating element in a case where a user performs a manipulation input on the educational tactile sensation providing apparatus of the first embodiment;

FIG. 8B is a diagram illustrating the driving patterns of the vibrating element in the case where the user performs the manipulation input on the educational tactile sensation providing apparatus of the first embodiment;

FIG. 9A is a diagram illustrating driving patterns of the vibrating element in a case where the user performs the manipulation input on the educational tactile sensation providing apparatus of the first embodiment;

FIG. 9B is a diagram illustrating the driving patterns of the vibrating element in the case where the user performs the manipulation input on the educational tactile sensation providing apparatus of the first embodiment;

FIG. 11A is a diagram that depicts procedures to download the tactile sensation data to the educational tactile sensation providing apparatus of the first embodiment;

FIG. 11B is a diagram that depicts the procedures to download the tactile sensation data to the educational tactile sensation providing apparatus of the first embodiment;

FIG. 12 is a diagram that depicts the procedures to download the tactile sensation data to the educational tactile sensation providing apparatus of the first embodiment;

FIG. 17A is a diagram illustrating a use mode of an educational tactile sensation providing apparatus according to a second embodiment;

FIG. 17B is a diagram illustrating the use mode of the educational tactile sensation providing apparatus according to the second embodiment;

FIG. 18A is a diagram that depicts procedures to download the tactile sensation data to the educational tactile sensation providing apparatus of the second embodiment;

FIG. 18B is a diagram that depicts the procedures to download the tactile sensation data to the educational tactile sensation providing apparatus of the second embodiment;

FIG. 19 is a diagram that depicts the procedures to download the tactile sensation data to the educational tactile sensation providing apparatus of the second embodiment;

DESCRIPTION OF EMBODIMENT

Hereinafter, embodiments to which an educational tactile sensation providing apparatus and a system of the present invention are applied will be described.

First Embodiment

FIGS. 1A and 1B are diagrams illustrating an example of a use mode of an educational tactile sensation providing apparatus 100 according to a first embodiment.

As illustrated in FIG. 1A, the educational tactile sensation providing apparatus 100 includes a top panel 120, a touch panel 150, and a display panel 160. The display panel 160 displays an image 510A of an elephant, an image 510B of a dolphin, and an image 510C of a penguin.

The educational tactile sensation providing apparatus 100 of the first embodiment may be used as an electronic picture book or an electronic educational material. In a state illustrated in FIG. 1A, the display panel 160 displays the image 510A of the elephant, the image 510B of the dolphin, and the image 510C of the penguin as candidates for selection. Because no image is selected in the state illustrated in FIG. 1A, nothing is displayed on a main area 160A of the display panel 160.

When a user performs a manipulation input on the top panel 120 to select the image 510A of the elephant, the elephant is displayed on the main area 160A of the display panel 160 as illustrated in FIG. 1B. When the user touches the image 510A of the elephant within the main area 160A, the educational tactile sensation providing apparatus 100 generates vibrations on a surface of the top panel 120 using driving patterns that represent tactile sensations of the elephant.

It is not easy to directly touch an actual elephant, an actual dolphin, or an actual penguin. However, when the user touches the top panel 120, disposed on a front face of the touch panel 150 of the educational tactile sensation providing apparatus 100, to trace the image 510A displayed on the display panel 160, the educational tactile sensation providing apparatus 100 vibrates to provide the tactile sensations as if the user were touching the surface of the elephant with the fingertip. The elephant is an example of a target tangible object.

In this way, even when the user does not touch an actual object, the educational tactile sensation providing apparatus 100 of the first embodiment provides simulated tactile sensations as if the user were touching the actual object when the user touches the top panel 120. The educational tactile sensation providing apparatus 100 is very useful for education for children and education for people with disabilities.

Figure 2:
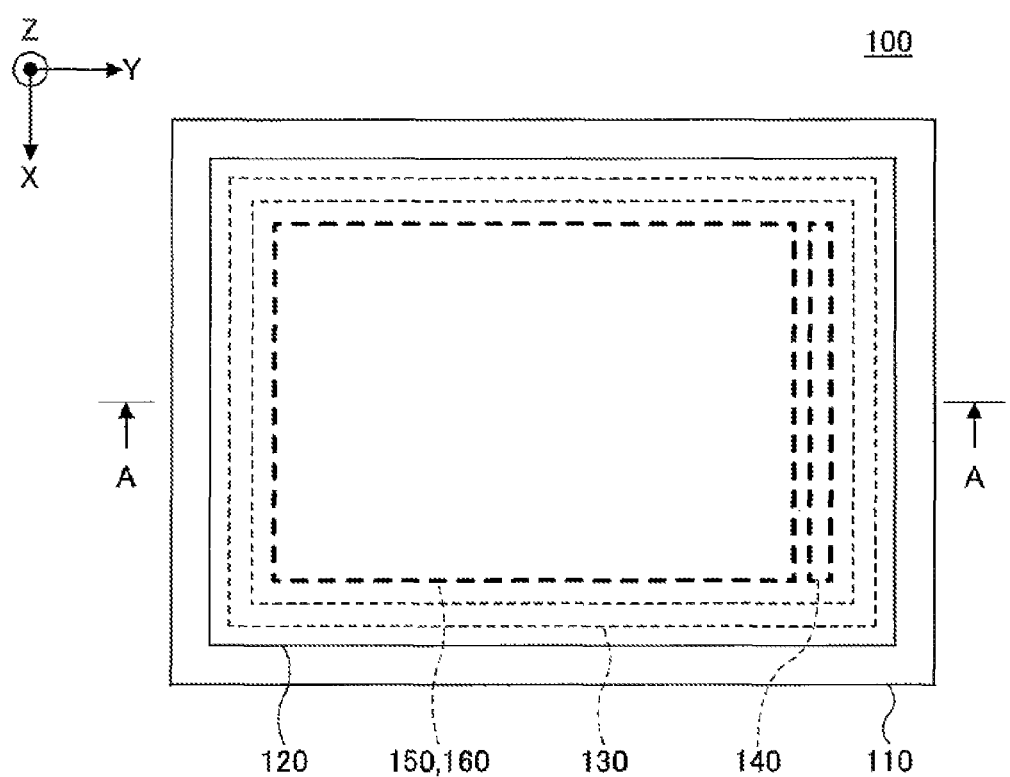
FIG. 2 is a diagram illustrating the educational tactile sensation providing apparatus of the first embodiment in plan view.
Figure 3:
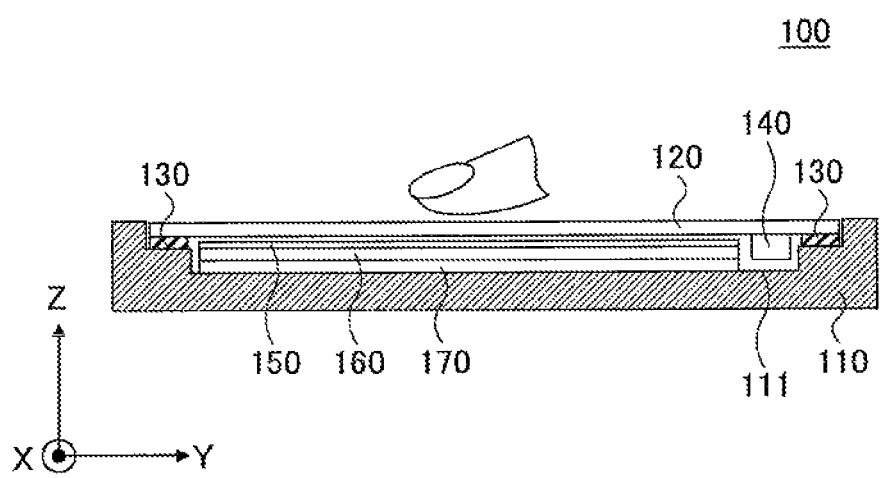
FIG. 3 is a diagram illustrating a cross-sectional view of the educational tactile sensation providing apparatus taken along a line A-A of FIG. 2.

FIG. 2 is a diagram illustrating the educational tactile sensation providing apparatus 100 of the first embodiment in plan view. FIG. 3 is a diagram illustrating a cross-sectional view of the educational tactile sensation providing apparatus 100 taken along a line A-A of FIG. 2. A XYZ coordinate system as an orthogonal coordinate system is defined in FIGS. 2 and 3.

The educational tactile sensation providing apparatus 100 includes a housing 110, a top panel 120, a double-faced adhesive tape 130, a vibrating element 140, a touch panel 150, a display panel 160, and a substrate 170.

The educational tactile sensation providing apparatus 100 is a tablet computer that includes the touch panel 150 as a manipulation input part, for example. The educational tactile sensation providing apparatus 100 becomes usable as an electronic picture book or an electronic educational material, when application data for causing a tablet computer to function as the educational tactile sensation providing apparatus 100 is downloaded to the tablet computer.

The housing 110 is made of a plastic, for example. As illustrated in FIG. 3, the substrate 170, the display panel 160 and the touch panel 150 are contained in a concave portion 111 of the housing 110, and the top panel 120 is adhered to the housing 110 by the double-faced adhesive tape 130.

The top panel 120 is a plate-shaped member having a rectangular shape in plan view and is made of a transparent glass or a reinforced plastic such as polycarbonate. A surface of the top panel 120 which is located on a positive side in Z axis direction is one example of a manipulation input surface on which the user of the educational tactile sensation providing apparatus 100 performs a manipulation input.

The vibrating element 140 is bonded on a surface of the top panel 120 which is located on a negative side in Z axis direction, and four sides in plan view of the top panel 120 are adhered to the housing 110 by the double-faced adhesive tape 130. Herein, the double-faced adhesive tape 130 is not necessarily a rectangular-ring-shaped member in plan view as illustrated in FIG. 3, as long as the double-faced adhesive tape 130 can adhere four sides of the top panel 120 to the housing 110.

The touch panel 150 is disposed on the negative side in Z axis direction of the top panel 120. The top panel 120 is provided in order to protect the surface of the touch panel 150. Another panel, protection film or the like may be provided on the surface of the top panel 120.

In a state where the vibrating element 140 is bonded to the surface of the top panel 120 located on the negative side in Z axis direction, the top panel 120 vibrates if the vibrating element 140 is being driven. In the first embodiment, a standing wave is generated in the top panel 120 by causing the top panel 120 to vibrate at a natural vibration frequency (natural resonance frequency or eigenfrequency) of the top panel 120. Because the vibrating element 140 is bonded to the top panel 120, it is preferable to determine the natural vibration frequency in consideration of a weight of the vibrating element 140 of the like, in a practical manner.

The vibrating element 140 is bonded on the surface of the top panel 120 which is located on the negative side in Z axis direction at a location along the short side extending in X axis direction at a positive side in Y axis direction. The vibrating element 140 may be any element as long as it can generate vibration at an ultrasound-frequency-band. A piezoelectric element such as a piezo element is used as the vibrating element 140, for example.

The vibrating element 140 is driven in accordance with a driving signal output from the drive controlling part which will be described later. An amplitude (intensity) and a frequency of the vibration output from the vibrating element 140 is set (determined) by the driving signal. An on/off action of the vibrating element 140 is controlled in accordance with the driving signal.

The ultrasound-frequency-band is a frequency band which is higher than or equal to about 20 kHz, for example. According to the educational tactile sensation providing apparatus 100 of the embodiment, the frequency at which the vibrating element 140 vibrates is equal to a number of vibrations per unit time (frequency) of the top panel 120. Accordingly, the vibrating element 140 is driven in accordance with the driving signal so that the vibrating element 140 vibrates at a number of natural vibrations per unit time (natural vibration frequency) of the top panel 120.

The touch panel 150 is disposed on an upper side (positive side in Z axis direction) of the display panel 160 and is disposed on a lower side (negative side in Z axis direction) of the top panel 120. The touch panel 150 is one example of a coordinate detector which detects a position at which the user of the educational tactile sensation providing apparatus 100 touches the top panel 120. Hereinafter, the position is referred to as a position of the manipulation input.

The display panel 160 disposed under the touch panel 150 displays various GUI buttons or the like (hereinafter referred to as Graphic User Interface (GUI) input part(s) 102). The user of the educational tactile sensation providing apparatus 100 ordinarily touches the top panel 120 with a fingertip in order to manipulate (operate) the GUI input part.

The touch panel 150 is any coordinate detector as long as it can detect the position of the manipulation input onto the top panel 120 performed by the user. The touch panel 150 may be a capacitance type coordinate detector or a resistance film type coordinate detector, for example. Hereinafter, the embodiment in which the touch panel 150 is the capacitance type coordinate detector will be described. In a case where the touch panel 150 is a capacitance type, the touch panel 150 can detect the manipulation input performed on the top panel 120 even if there is a clearance gap between the touch panel 150 and the top panel 120.

Although the top panel 120 is disposed on the manipulation input surface side of the touch panel 150 in the present embodiment, the top panel 120 may be integrated with the touch panel 150. In this case, the surface of the touch panel 150 is equal to the surface of the top panel 120 as illustrated in FIGS. 2 and 3, and the surface of the touch panel 150 becomes the manipulation input surface. Otherwise, the top panel 120 as illustrated in FIGS. 2 and 3 may be omitted. In this case, the surface of the touch panel 150 constitutes the manipulation input surface. In this case, the vibrating element 140 vibrates the manipulation input surface at a natural vibration frequency of a member having the manipulation input surface.

In a case where the touch panel 150 is a capacitance type, the touch panel 150 may be disposed on the top panel 120. In this case, the surface of the touch panel 150 constitutes the manipulation input surface. In a case where the touch panel 150 is a capacitance type, the top panel 120 as illustrated in FIGS. 2 and 3 may be omitted. In this case, the surface of the touch panel 150 constitutes the manipulation input surface. In this case, the vibrating element 140 vibrates the manipulation input surface at a natural vibration frequency of a member having the manipulation input surface.

The display panel 160 is a display part which displays an image. The display panel 160 may be a liquid crystal display panel, an organic Electroluminescence (EL) panel or the like, for example. The display panel 160 is disposed in the concave portion 111 of the housing 110 and is disposed on (the positive side in Z axis direction of) the substrate 170.

The display panel 160 is driven and controlled by a driver Integrated Circuit (IC) and displays the GUI input part, the image, characters, symbols, graphics or the like in accordance with an operating state of the educational tactile sensation providing apparatus 100.

The substrate 170 is disposed in the concave portion 111 of the housing 110. The display panel 160 and the touch panel 150 are disposed on the substrate 170. The display panel 160 and the touch panel 150 are fixed to the substrate 170 and the housing 110 by a holder or the like (not shown).

On the substrate 170, a drive controlling apparatus which will be described hereinafter and circuits or the like that are necessary for driving the educational tactile sensation providing apparatus 100 are mounted.

In the educational tactile sensation providing apparatus 100 having the configuration as described above, when the user touches the top panel 120 with the fingertip and a movement of the fingertip is detected, the drive controlling part mounted on the substrate 170 drives the vibrating element 140 so that the top panel 120 vibrates at a frequency in the ultrasound-frequency-band. The frequency in the ultrasound-frequency-band is a resonance frequency of a resonance system including the top panel 120 and the vibrating element 140. A standing wave is generated in the top panel 120 at the frequency.

The educational tactile sensation providing apparatus 100 generates the standing wave at the ultrasound-frequencyband in the top panel 120 to provide a tactile sensation (haptic sensation) to the user through the top panel 120.

Next, the standing wave generated in the top panel 120 is described with reference to FIGS. 4A and 4B.

FIGS. 4A and 4B are diagrams illustrating crests and troughs of the standing wave formed in parallel with the short side of the top panel 120 included in the standing waves generated in the top panel 120 by the natural vibration at the ultrasound-frequency-band. FIG. 4A illustrates a side view, and FIG. 4B illustrates a perspective view. In FIGS. 4A and 4B, a XYZ coordinate system similar to that described in FIGS. 2 and 3 is defined. In FIGS. 4A and 4B, the amplitude of the standing wave is overdrawn in an easy-to-understand manner. The vibrating element 140 is omitted in FIGS. 4A and 4B.

The natural vibration frequency (the resonance frequency) f of the top panel 120 is represented by formulas (1) and (2) where E is the Young's modulus of the top panel 120, ρ is the density of the top panel 120, δ is the Poisson's ratio of the top panel 120, l is the long side dimension of the top panel 120, t is the thickness of the top panel 120, and k is a periodic number of the standing wave along the direction of the long side of the top panel 120. Because the standing wave has the same waveforms in every half cycle, the periodic number k takes values at 0.5 intervals. The periodic number k takes 0.5, 1, 1.5, 2 . . . .

$$f = \frac{\pi k^2 t}{l^2} \sqrt{\frac{E}{3\rho(1-\delta^2)}} \quad (1)$$

$$f = \alpha k^2 \quad (2)$$

The coefficient α included in formula (2) corresponds to coefficients other than k2 included in formula (1).

A waveform of the standing wave as illustrated FIGS. 4A and 4B is obtained in a case where the periodic number k is 10, for example. In a case where a sheet of Gorilla (registered trademark) glass of which the length l of the long side is 140 mm, the length of the short side is 80 mm, and the thickness t is 0.7 mm is used as the top panel 120, for example, the natural vibration number f is 33.5 kHz, if the periodic number k is 10. In this case, a frequency of the driving signal is 33.5 kHz.

The top panel 120 is a planar member. If the vibrating element 140 (see FIGS. 2 and 3) is driven and the natural vibration at the ultrasound-frequency-band is generated in the top panel 120, the top panel 120 is bent as illustrated in FIGS. 4A and 4B. As a result, the standing wave is generated in the surface of the top panel 120.

In the present embodiment, the single vibrating element 140 is bonded on the surface of the top panel 120 which is located on the negative side in Z axis direction at the location along the short side extending in X axis direction at the positive side in Y axis direction. The educational tactile sensation providing apparatus 100 may include two vibrating elements 140. In a case where the educational tactile sensation providing apparatus 100 includes two vibrating elements 140, another vibrating element 140 may be bonded on the surface of the top panel 120 which is located on the negative side in Z axis direction at a location along the short side extending in X axis direction at a negative side in Y axis direction. In this case, the two vibrating elements 140 may be axisymmetrically disposed with respect to a center line of the top panel 120 parallel to the two short sides of the top panel 120.

In a case where the educational tactile sensation providing apparatus 100 includes two vibrating elements 140, the two vibrating elements 140 may be driven in the same phase, if the periodic number k is an integer number. If the periodic number k is an odd number, the two vibrating elements 140 may be driven in opposite phases.

Next, the natural vibration at the ultrasound-frequency-band generated in the top panel 120 of the educational tactile sensation providing apparatus 100 is described with reference to FIGS. 5A and 5B.

FIGS. 5A and 5B are diagrams illustrating cases where a kinetic friction force applied to the fingertip varies when the natural vibration at the ultrasound-frequency-band is generated in the top panel 120 of the educational tactile sensation providing apparatus 100. In FIGS. 5A and 5B, the manipulation input is performed with the fingertip. In FIGS. 5A and 5B, the user touches the top panel 120 with the fingertip and performs the manipulation input by tracing the top panel 120 with the fingertip in a direction from a far side to a near side with respect to the user. An on/off state of the vibration is switched by controlling an on/off state of the vibrating element 140 (see FIGS. 2 and 3).

In FIGS. 5A and 5B, areas which the fingertip touches while the vibration is turned off are indicated in grey in the depth direction of the top panel 120. Areas which the fingertip touches while the vibration is turned on are indicated in white in the depth direction of the top panel 120.

As illustrated in FIGS. 4A and 4B, the natural vibration at the ultrasound-frequency-band occurs on an entire surface of the top panel 120. FIGS. 5A and 5B illustrate operation patterns in which the on/off state of the natural vibration is switched while the user's fingertip is tracing the top panel 120 from the far side to the near side.

Accordingly, in FIGS. 5A and 5B, areas which the fingertip touches while the vibration is turned off are indicated in grey in the depth direction of the top panel 120. Areas which the fingertip touches while the vibration is turned on are indicated in white in the depth direction of the top panel 120.

In the operation pattern as illustrated in FIG. 5A, the vibration is turned off when the user's fingertip is located on the far side of the top panel 120, and the vibration is turned on in the process of tracing the top panel 120 with the fingertip toward the near side.

In contrast, in the operation pattern as illustrated in FIG. 5B, the vibration is turned on when the user's fingertip is located on the far side of the top panel 120, and the vibration is turned off in the process of tracing the top panel 120 with the fingertip toward the near side.

In a state where the natural vibration at the ultrasound-frequency-band is generated in the top panel 120, a layer of air intervenes between the surface of the top panel 120 and the fingertip. The layer of air is provided by a squeeze film effect. As a result, a kinetic friction coefficient on the surface of the top panel 120 is decreased when the user traces the surface with the fingertip.

Accordingly, in the grey area located on the far side of the top panel 120 as illustrated in FIG. 5A, the kinetic friction force applied to the fingertip increases. In the white area located on the near side of the top panel 120, the kinetic friction force applied to the fingertip decreases.

Therefore, the user who is performing the manipulation input to the top panel 120 in a manner as illustrated in FIG. 5A senses a reduction of the kinetic friction force applied to the fingertip when the vibration is turned on. As a result, the user senses a slippery or smooth touch (texture) with the fingertip. In this case, the user senses as if a concave portion were present on the surface of the top panel 120 when the surface of the top panel 120 becomes slippery and the kinetic friction force decreases.

In contrast, in the white area located on the far side of the top panel 120 as illustrated in FIG. 5B, the kinetic friction force applied to the fingertip decreases. In the grey area located on the near side of the top panel 120, the kinetic friction force applied to the fingertip increases.

Therefore, the user who is performing the manipulation input in the top panel 120 in a manner as illustrated in FIG. 5B senses an increase of the kinetic friction force applied to the fingertip when the vibration is turned off. As a result, the user senses a grippy or scratchy touch (texture) with the fingertip. In this case, the user senses as if a convex portion were present on the surface of the top panel 120 when the surface of the top panel 120 becomes grippy and the kinetic friction force increases.

Accordingly, the user can sense a concavity or convexity with the fingertip in the cases as illustrated in FIGS. 5A and 5B. For example, "The Printed-matter Typecasting Method for Haptic Feel Design and Sticky-band Illusion" (the Collection of papers of the 11th SICE system integration division annual conference (SI2010, Sendai)_174-177, 2010-12) discloses that a human can sense a concavity or a convexity. "Fishbone Tactile Illusion" (Collection of papers of the 10th Congress of the Virtual Reality Society of Japan (September, 2005)) discloses that a human can sense a concavity or a convexity as well.

Although a variation of the kinetic friction force when the vibration is switched on or off is described above, a variation of the kinetic friction force similar to those described above is obtained when the amplitude (intensity) of the vibrating element 140 is varied.

In the following, a configuration of the educational tactile sensation providing apparatus 100 according to the first embodiment is described with reference to FIG. 6.

Figure 6:
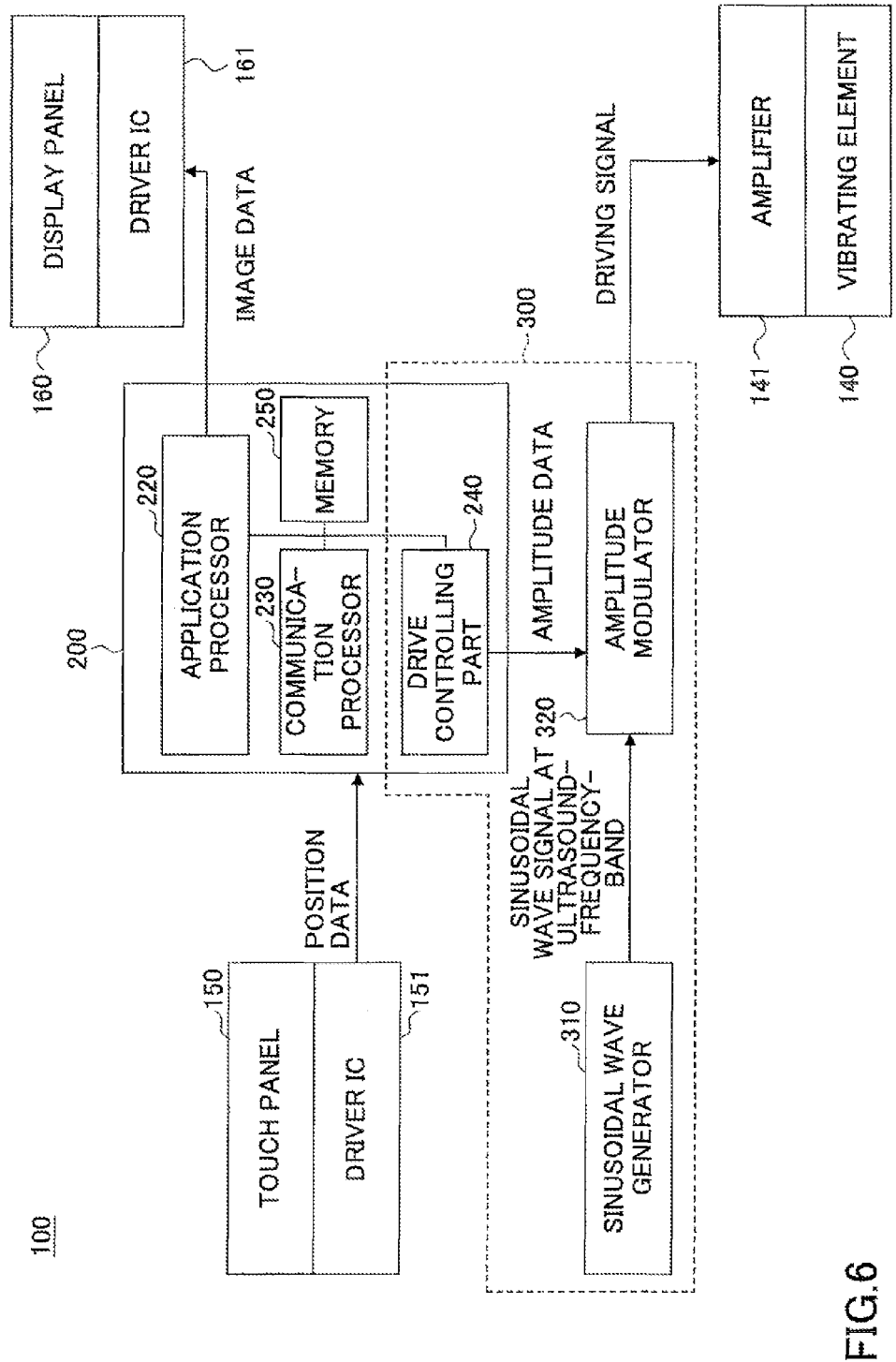
FIG. 6 is a diagram illustrating a configuration of the educational tactile sensation providing apparatus according to the first embodiment.

FIG. 6 is a diagram illustrating the configuration of the educational tactile sensation providing apparatus 100 according to the first embodiment.

The educational tactile sensation providing apparatus 100 includes the vibrating element 140, an amplifier 141, the touch panel 150, a driver Integrated Circuit (IC) 151, the display panel 160, a driver IC 161, a controller 200, a sinusoidal wave generator 310 and an amplitude modulator 320.

The controller 200 includes an application processor 220, a communication processor 230, a drive controlling part 240 and a memory 250. The controller 200 is realized by an IC chip, for example.

The drive controlling part 240, the sinusoidal wave generator 310 and the amplitude modulator 320 constitute a drive controlling apparatus 300. Although an embodiment in which the application processor 220, the communication processor 230, the drive controlling part 240 and the memory 250 are included in the single controller 200 is described, the drive controlling part 240 may be disposed outside of the controller 200 and realized by another IC chip or a processor. In this case, data which is necessary for a drive control performed by the drive controlling part 240 among data stored in the memory 250 may be stored in another memory disposed in the drive control apparatus 300.

In FIG. 6, the housing 110, the top panel 120, the double-faced adhesive tape 130 and the substrate 170 (see FIG. 2) are omitted. Herein, the amplifier 141, the driver IC 151, the driver IC 161, the drive controlling part 240, the memory 250, the sinusoidal wave generator 310 and the amplitude modulator 320 are described.

The amplifier 141 is disposed between the drive controlling apparatus 300 and the vibrating element 140. The amplifier 141 amplifies the driving signal output from the drive controlling apparatus 300 and drives the vibrating element 140.

The driver IC 151 is connected to the touch panel 150. The driver IC 151 detects position data representing the position on the touch panel 150 at which the manipulation input is performed and outputs the position data to the controller 200. As a result, the position data is input to the application processor 220 and the drive controlling part 240. Inputting the position data to the drive controlling part 240 is equal to inputting the position data to the drive controlling apparatus 300.

The driver IC 161 is connected to the display panel 160. The driver IC 161 inputs image data output from the drive controlling apparatus 300 to the display panel 160 and displays a picture image on the display panel 160 based on the image data. Accordingly, the GUI input part, the picture image or the like is displayed on the display panel 160 based on the image data.

The application processor 220 outputs image data that represents GUI input parts, images, characters, symbols, figures, or the like to the driver IC 161. The image data is necessary for the user to manipulate the educational tactile sensation providing apparatus 100.

The communication processor 230 performs processes that are necessary for the educational tactile sensation providing apparatus 100 to perform communications such as WiFi, Bluetooth (registered trademark), non-contact short distance communication, or the like. In a case where the educational tactile sensation providing apparatus 100 does not have to perform the communication, the educational tactile sensation providing apparatus 100 does not have to include the communication processor 230.

The drive controlling part 240 outputs amplitude data to the amplitude modulator 320. The amplitude data represents an amplitude value used for controlling an intensity of the driving signal used for driving the vibrating element 140. The amplitude data that represents the amplitude value may be stored in the memory 250.

The educational tactile sensation providing apparatus 100 of the first embodiment causes the top panel 120 to vibrate in order to vary the kinetic friction force applied to the user's fingertip when the fingertip traces along the surface of the top panel 120.

There are various manipulation inputs such as a flick operation, a swipe operation and a drag operation, for example, that the user performs when the user moves the fingertip along the surface of the top panel 120.

The flick operation is performed by flicking (snapping) the surface of the top panel 120 for a relatively-short distance with the fingertip. The swipe operation is performed by swiping the surface of the top panel 120 for a relatively-long distance with the fingertip. The drag operation is performed by moving the fingertip along the surface of the top panel 120 while selecting a button or the like displayed on the display panel 160 when the user slides the button of the like.

The manipulation inputs that are performed by moving the fingertip along the surface of the top panel 120, such as the flick operation, the swipe operation and the drag operation that are introduced as examples, are used differently depending on a kind of the GUI input part of the like displayed on the display panel 160.

In addition to the above described processes, the drive controlling part 240 may set the amplitude value in accordance with a temporal change degree of the position data.

Here, a moving speed of the user's fingertip tracing along the surface of the top panel 120 is used as the temporal change degree of the position data. The drive controlling part 240 may calculate the moving speed of the user's fingertip based on a temporal change degree of the position data input from the driver IC 151.

The higher the moving speed becomes, the smaller the educational tactile sensation providing apparatus 100 controls the amplitude value to be, for the sake of making an intensity of the tactile sensation sensed by the user constant regardless of the moving speed of the fingertip, for example. The lower the moving speed becomes, the greater the educational tactile sensation providing apparatus 100 controls the amplitude value to be, for the sake of making the intensity constant regardless of the moving speed of the fingertip, for example.

Data which represents a relationship between the amplitude data, representing the amplitude value, and the moving speed may be stored in the memory 250.

Although the amplitude value in accordance with the moving speed is set by using the data that represents the relationship between the amplitude data representing the amplitude value and the moving speed in the present embodiment, the amplitude value A may be calculated based on formula (3). The higher the moving speed becomes, the smaller the amplitude value A calculated by formula (3) becomes. The lower the moving speed becomes, the greater the amplitude value A calculated by formula (3) becomes.

$$A = A_0 / \sqrt{|V|/a} \qquad (3)$$

"$A_0$" is a reference value of the amplitude, "V" represents the moving speed of the fingertip and "a" is a designated constant value. In a case where the amplitude value A is calculated by using formula (3), data representing formula (3) and data representing the reference value $A_0$ and the designated constant value a may be stored in the memory 250.

The drive controlling part 240 causes the vibrating element 140 to vibrate when the moving speed becomes greater than or equal to a designated threshold speed.

Accordingly, the amplitude value represented by the amplitude data output from the drive controlling part 240 becomes zero in a case where the moving speed is less than the designated threshold speed. The amplitude value is set to a designated amplitude value corresponding to the moving speed in a case where the moving speed is greater than or equal to the designated threshold speed. In a case where the moving speed is greater than or equal to the designated threshold speed, the higher the moving speed becomes, the smaller the amplitude value becomes. In a case where the moving speed is greater than or equal to the designated threshold speed, the lower the moving speed becomes, the greater the amplitude value becomes.

The memory 250 stores data that associates coordinate data with pattern data. The coordinate data represents the GUI input part or the like on which the manipulation input is performed. The pattern data represents the amplitude data.

The sinusoidal wave generator 310 generates sinusoidal waves used for generating the driving signal which causes the top panel 120 to vibrate at the natural vibration frequency. For example, in a case of causing the top panel 120 to vibrate at 33.5 kHz of the natural vibration frequency f, a frequency of the sinusoidal waves becomes 33.5 kHz. The sinusoidal wave generator 310 inputs a sinusoidal wave signal at the ultrasound-frequency-band to the amplitude modulator 320.

The amplitude modulator 320 generates the driving signal by modulating an amplitude of the sinusoidal wave signal input from the sinusoidal wave generator 310 based on the amplitude data input from the drive controlling part 240. In the basic operation, the amplitude modulator 320 modulates the amplitude of the sinusoidal wave signal at the ultrasound-frequency-band input from the sinusoidal wave generator 310 and does not modulate a frequency and a phase of the sinusoidal wave signal in order to generate the driving signal.

Therefore, the driving signal output from the amplitude modulator 320 is a sinusoidal wave signal at the ultrasound-frequency-band obtained by modulating only the amplitude of the sinusoidal wave signal at the ultrasound-frequency-band input from the sinusoidal wave generator 310. In a case where the amplitude data is zero, the amplitude of the driving signal becomes zero. This is the same as the amplitude modulator 320 not outputting the driving signal.

The amplitude modulator 320 can modulate the sinusoidal wave signal at the ultrasound-frequency-band input from the sinusoidal wave generator 310 by using a sinusoidal wave signal at an audible frequency band. In this case, a driving signal output from the amplitude modulator 320 becomes a signal in which a driving signal at the audible frequency band is superimposed on a driving signal at the ultrasound-frequency-band and an amplitude of the signal is set by the amplitude modulator 320.

In the following, the data stored in the memory 250 is described with reference to FIGS. 7A and 7B.

FIGS. 7A and 7B are diagrams illustrating the data stored in the memory 250.

The data illustrated in FIG. 7A is tactile sensation data that associates, image data, coordinate data, and amplitude data with ID (IDentification).

The ID is an identifier of the tactile sensation data. In FIG. 7A, 001, 002, 003, 004 and the like are illustrated as an example of the ID.

The image data represents an image of a target tangible object such as the image 510A of the elephant illustrated in FIG. 1. In FIG. 7A, I001, I002, I003, I004 and the like of the image data are illustrated.

The coordinate data represents coordinates of the image in the image data. For example, coordinates may be allocated to each pixel. A constant number of pixels may be allocated to each unit area as single unit area. In FIG. 7A, f1 to f4 of the coordinate data are illustrated.

The amplitude data represents amplitude values for controlling an intensity of the driving signal used to drive the vibrating element 140. The amplitude data is allocated to the area represented by each coordinate data. In FIG. 7A, A1 (X,Y), A2 (X,Y), A3 (X,Y), and A4 (X,Y) of the amplitude data are illustrated.

For example, a shape, convex portions, concave portions, and the like of a surface of an actual target tangible object are measured by 3D scanning or the like. The amplitude values of the amplitude data allocated to the area represented by each coordinate data may be set as amplitude values in accordance with the measured value such that the user can sense the shape, the convex portions, the concave portions, and the like of the target tangible object with the fingertip based on the natural vibrations at the ultrasound-frequency-band of the top panel 120.

The data illustrated in FIG. 7B associates amplification factor data representing an amplification factor of the amplitude value with the moving speed. According to the data as illustrated in FIG. 7B, the amplification factor is set to 0 in a case where the moving speed V is greater than or equal to 0 and less than b1 (0<=V<b1), the amplification factor is set to G1 in a case where the moving speed V is greater than or equal to b1 and less than b2 (b1<=V<b2), and the amplification factor is set to G2 in a case where the moving speed V is greater than or equal to b2 and less than b3 (b2<=V<b3).

For example, in order to make the tactile sensation sensed by the user's fingertip constant regardless of the moving speed of the fingertip, a lower amplitude value is set as the moving speed increases by using the amplification factor data illustrated in FIG. 7B, and a higher amplitude value is set as the moving speed decreases by using the amplification factor data.

FIGS. 8A and 8B are diagrams illustrating driving patterns of the vibrating element 140 in a case where the user performs the manipulation input on the educational tactile sensation providing apparatus 100 of the first embodiment.

FIG. 8A illustrates a situation where the user's fingertip touches the top panel 120 of the educational tactile sensation providing apparatus 100 and traces the image 510A being displayed on the display panel 160.

In FIG. 8B, a lateral axis indicates a position of the user's fingertip in the tracing direction of the image 510A in FIG. 8A, and a vertical axis indicates an amplitude of the driving signal. Points A to D are illustrated in the lateral direction. FIG. 8B illustrates an example of the driving patterns in a case where the user's fingertip traces the image 510A.

In FIGS. 8A and 8B, the manipulation input starts from the point A. However, because the point A is outside of an area of the image 510A that represents the elephant, the drive controlling part 240 does not drive the vibrating element 140 at this point of time. Therefore, the amplitude is zero.

When the user's fingertip moves and reaches the point B, the drive controlling part 240 drives the vibrating element 140 based on the tactile sensation data because the point B is inside of the area of the image 510A that represents the elephant. Because the tactile sensation data includes the coordinate data and the amplitude data as illustrated in FIG. 7A, the drive controlling part 240 outputs the amplitude data corresponding to the position data input from the driver IC 151.

When the position of the manipulation input moves from the point B to the point C, the drive controlling part 240 increases the amplitude exponentially at the point B, and then increases and decreases the amplitude repeatedly at a fast cycle. Then the drive controlling part 240 decreases the amplitude slightly, and increases and decreases the amplitude repeatedly at slower cycle so that the cycle of the vibration becomes slightly longer. Then the drive controlling part 240 drives the vibrating element 140 in response to the driving patterns so that the cycle of the vibration becomes shorter again toward the point C.

The driving patterns between the point B and the point C provide the tactile sensations to the fingertip as the kinetic friction force applied to the fingertip exponentially decreases from the point B and thereafter the kinetic friction force increases and decreases in accordance with periodic increase and decrease of the amplitude.

Such tactile sensations reproduce tactile sensations of a rough skin that a human senses when the human touches a surface of an actual elephant.

When the position of the user's fingertip passes the point C, the drive controlling part 240 stops the vibrating element 140 because the point C is outside of the area of the image 510A that represents the elephant. Therefore, between the point C and the point D, the amplitude is zero.

Such driving patterns represent a driving signal that changes the amplitude based on the amplitude data at a frequency of 35 kHz.

When the position of the manipulation input reaches the display area of the image 510A, the vibrating element 140 is turned on. As a result, the kinetic friction coefficient applied to the user's fingertip is decreased by the squeeze film effect and the fingertip becomes easy to move over the surface of the top panel 120.

When the position of the manipulation input reaches outside of the display area of the image 510A, the drive controlling part 240 turns the vibrating element 140 off. The drive controlling part 240 may turn the vibrating element 140 off by setting the amplitude to zero.

When the vibrating element 140 is turned off, the natural vibration at the ultrasound-frequency-band of the top panel 120 is turned off. As a result, the user senses a grippy or scratchy touch (texture) with the fingertip. In this case, the user senses as if a convex portion were present on the surface of the top panel 120 when the surface of the top panel 120 becomes grippy and the kinetic friction force increases.

FIGS. 9A and 9B are diagrams illustrating driving patterns of the vibrating element 140 in a case where the user performs the manipulation input on the educational tactile sensation providing apparatus 100 of the first embodiment.

FIG. 9A illustrates a situation where the user's fingertip touches the top panel 120 of the educational tactile sensation providing apparatus 100 and traces the image 510B being displayed on the display panel 160.

In FIG. 9B, a lateral axis indicates a position of the user's fingertip in the tracing direction of the image 510B in FIG. 9A, and a vertical axis indicates an amplitude of the driving signal. Points A to D are illustrated in the lateral direction. FIG. 9B illustrates an example of the driving patterns in a case where the user's fingertip traces the image 510B.

In FIGS. 9A and 9B, the manipulation input starts from the point A. However, because the point A is outside of an area of the image 510B that represents the dolphin, the drive controlling part 240 does not drive the vibrating element 140 at this point of time. Therefore, the amplitude is zero.

When the user's fingertip moves and reaches the point B, the drive controlling part 240 drives the vibrating element 140 based on the tactile sensation data because the point B is inside of the area of the image 510B that represents the dolphin. Because the tactile sensation data includes the coordinate data and the amplitude data as illustrated in FIG. 7A, the drive controlling part 240 outputs the amplitude data corresponding to the position data input from the driver IC 151.

When the position of the manipulation input moves to the point C from the point B, the drive controlling part 240 drives the vibrating element 140 in response to the driving patterns so that the amplitude exponentially increases at the point B, after that, the amplitude decreases, after that, the amplitude increases toward the point C, after that, the amplitude decreases immediately before the point C.

Such driving patterns between the point B and the point C provide the tactile sensations to the fingertip as the kinetic friction force applied to the fingertip exponentially decreases from the point B, after that, the kinetic friction force increases in accordance with decrease of the amplitude, after that, the kinetic friction force decreases again in accordance with increasing of the amplitude toward the point C, after that, the kinetic friction force increases immediately before the point C in accordance with decreasing of the amplitude.

Such tactile sensations reproduce slippery tactile sensations that a human senses with the fingertip when the human touches a surface of an actual dolphin.

When the position of the user's fingertip passes the point C, the drive controlling part 240 stops the vibrating element 140 because the point C is outside of the area of the image 510B that represents the dolphin. Therefore, between the point C and the point D, the amplitude is zero.

Such driving patterns represent a driving signal that changes the amplitude based on the amplitude data at a frequency of 35 kHz.

When the position of the manipulation input reaches the display area of the image 510B, the vibrating element 140 is turned on. As a result, the kinetic friction coefficient applied to the user's fingertip is decreased by the squeeze film effect and the fingertip becomes easy to move over the surface of the top panel 120.

When the position of the manipulation input reaches outside of the display area of the image 510B, the drive controlling part 240 turns the vibrating element 140 off. The drive controlling part 240 may turn the vibrating element 140 off by setting the amplitude to zero.

When the vibrating element 140 is turned off, the natural vibration at the ultrasound-frequency-band of the top panel 120 is turned off. As a result, the user senses a grippy or scratchy touch (texture) with the fingertip. In this case, the user senses as if a convex portion were present on the surface of the top panel 120 when the surface of the top panel 120 becomes grippy and the kinetic friction force increases.

Figure 10:
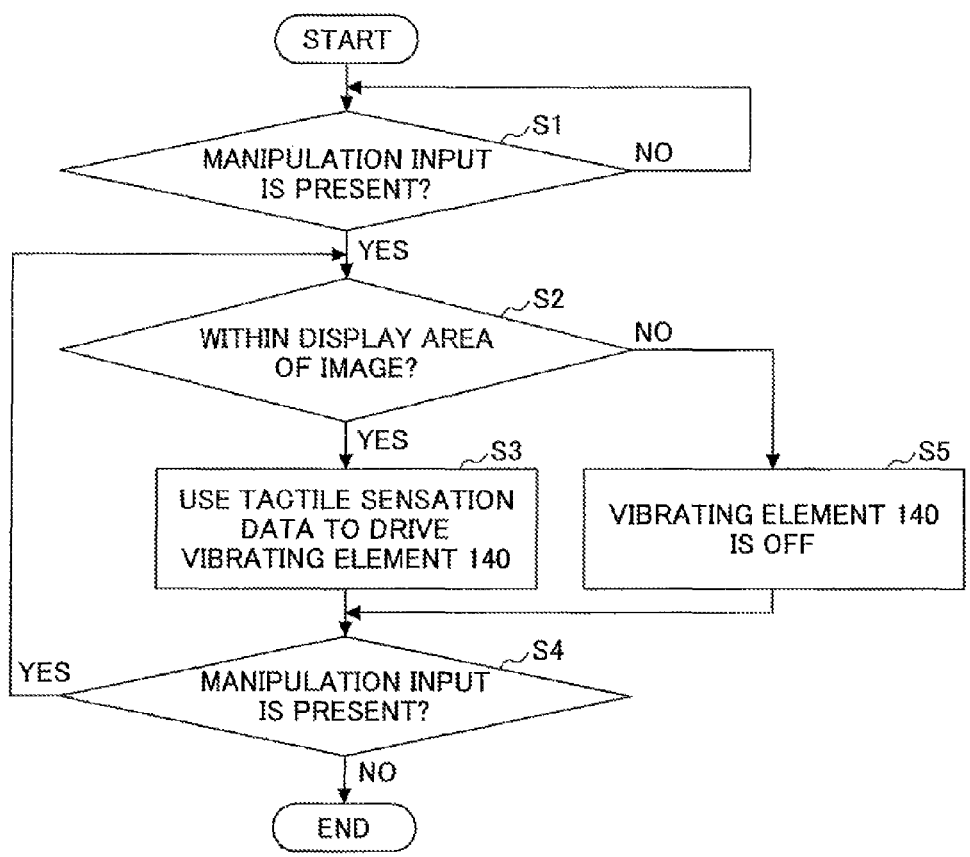
FIG. 10 is a diagram illustrating a flowchart executed by a drive controlling part of the educational tactile sensation providing apparatus according to the first embodiment.

FIG. 10 is a diagram illustrating a flowchart executed by the drive controlling part 240 of the educational tactile sensation providing apparatus 100 according to the first embodiment.

First, the drive controlling part 240 determines whether the manipulation input is present (step S1). The drive controlling part 240 may determine presence/absence of the manipulation input based on whether the position data is input from the driver IC 151 (see FIG. 6).

When the drive controlling part 240 determines that the manipulation input is present (yes at step S1), the drive controlling part 240 determines whether a position of the manipulation input is within the display area of the image 510A (step S2). This is because a driving state (on/off) of the vibrating element 140 varies depending on whether the position is within the display area of the image 510A.

When the drive controlling part 240 determines that the position of the manipulation input is within the display area of the image 510A (yes at step S2), the flow proceeds to step S3.

The drive controlling part 240 uses the tactile sensation data to drive the vibrating element 140 (step S3). The drive controlling part 240 extracts, from the tactile sensation data, the amplitude data corresponding to the position data input from the driver IC151, and outputs the amplitude data. In this way, the vibrating element 140 is driven based on the amplitude data.

Next, the drive controlling part 240 determines whether the manipulation input is present (step S4). The drive controlling part 240 may determine presence/absence of the manipulation input based on whether the position data is input from the driver IC 151 (FIG. 6).

When the drive controlling part 240 determines that the manipulation input is present (yes at step S4), the flow returns to step S2.

In contrast, when the drive controlling part 240 determines that the manipulation input is not present (No at step S4), a series of processes ends (END). The drive controlling part 240 does not have to drive the vibrating element 140 in a case where the manipulation input is not present because the user does not perform the manipulation input in this case.

When the drive controlling part 240 determines that the position of the manipulation input is not within the display area of the image 510A (no at step S2), the flow proceeds to step S4. Presence/absence of the manipulation input is determined at step S4. When the manipulation input is present, the flow returns to step S2.

FIGS. 11 and 12 are diagrams that depict procedures to download the tactile sensation data to the educational tactile sensation providing apparatus 100 of the first embodiment.

The educational tactile sensation providing apparatus 100 has a function to communicate with a server via a network. Such a function is implemented by the communication processor 230 (see FIG. 6). The user downloads application data for causing the educational tactile sensation providing apparatus 100 to function via the network, and stores the data in the memory 250 (see FIG. 6) of the educational tactile sensation providing apparatus 100.

Following procedures may be performed for starting the download. When the application for downloading the tactile sensation data is executed, a download (DL) button 161 is displayed as a GUI button on the main area 160A of the display panel 160 as illustrated in FIG. 11A. The user may manipulate the DL button 161 to execute the download of the tactile sensation data.

FIG. 11B illustrates a state in which 3 kinds of tactile sensation data 251A, 251B and 251C are stored in the memory 250 of the educational tactile sensation providing apparatus 100.

As illustrated in FIG. 11B, the application data includes tactile sensation data on various kinds of creatures, plants, and the like. The user may select and download favorite tactile sensation data, and store the data in the memory 250.

FIG. 12 illustrates a situation where tactile sensation data having ID 0011, tactile sensation data having ID 0012, tactile sensation data having ID 0013, and the like are uploaded on a server 700, and the user downloads only necessary tactile sensation data to his or her own educational tactile sensation providing apparatus 100.

In this way, the user may download, to his or her own educational tactile sensation providing apparatus 100, only tactile sensation data of the target tangible object that the user desires to obtain to sense the tactile sensations at that time.

It is effective to return data except for the latest data to the server 700. The user can feel the tactile sensations by using the tactile sensation data that the user has stored in the educational tactile sensation providing apparatus 100. In this method, the latest information of the server 700 can be used as appropriate via an application on the web or the like, and unnecessary consumption of the capacity of the memory 250 is prevented.

Figure 13:
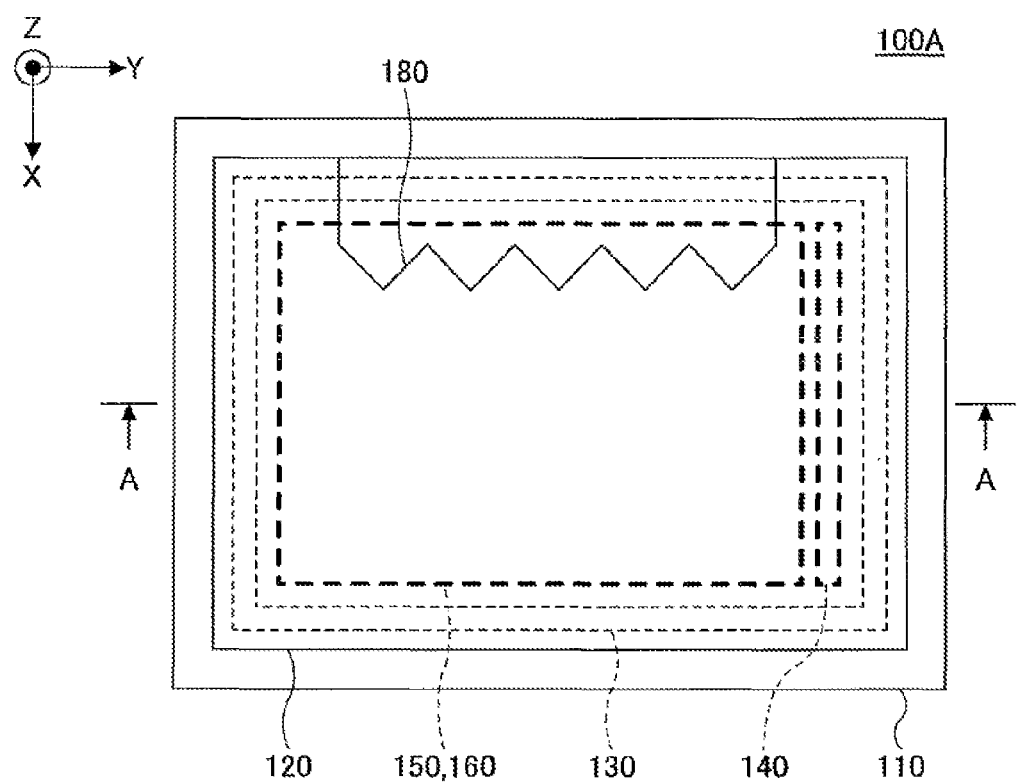
FIG. 13 is a diagram illustrating an educational tactile sensation providing apparatus according to a first variation example of the first embodiment.

FIG. 13 is a diagram illustrating an educational tactile sensation providing apparatus 100A according to a first variation example of the first embodiment.

In the educational tactile sensation providing apparatus 100A, a heater 180 is added to the educational tactile sensation providing apparatus 100 illustrated in FIGS. 1 to 3. Other configurations of the educational tactile sensation providing apparatus 100A are similar to the configurations of the educational tactile sensation providing apparatus 100 illustrated in FIGS. 1 to 3.

The heater 180 (see FIG. 13) is disposed on a back face side of the top panel 120 in order to control a temperature of the surface of the top panel 120. For convenience of description, FIG. 13 illustrates one heating wire as the heater 180. However, the heater 180 may be provided all over the face of the top panel 120. The heater 180 may be disposed on the back face of the touch panel 150 or the back face of the display panel 160. The heater 180 may be a resistant form transparent conductive film, an alloy heater such as a nickel alloy heater, or the like. For example, the heater 180 may increase the temperature from an ambient temperature to about 60° C.

An element that can lower the temperature to a temperature lower than the ambient temperature such as a Peltier element may be used instead of the heater 180 or in addition to the heater 180.

In a case of displaying a warm object as a target tangible object, by causing the user to sense warmth in addition to the tactile sensations based on the vibrations, more realistic tactile sensations can be provided to the user. Likewise, in a case of displaying a cold object as a target tangible object, by causing the user to sense coldness in addition to the tactile sensations based on the vibrations, more realistic tactile sensations can be provided to the user.

A set temperature of the heater 180 may be a predetermined fixed temperature depending on a kind of the target tangible object. In a case where tactile sensations of a target tangible object having a temperature distribution depending on regions are provided, a plurality of heaters 180 may be provided and temperature data that represents a set temperature of each heater 180 may be added to the tactile sensation data to express the temperature distribution of the target tangible object.

Figure 14:
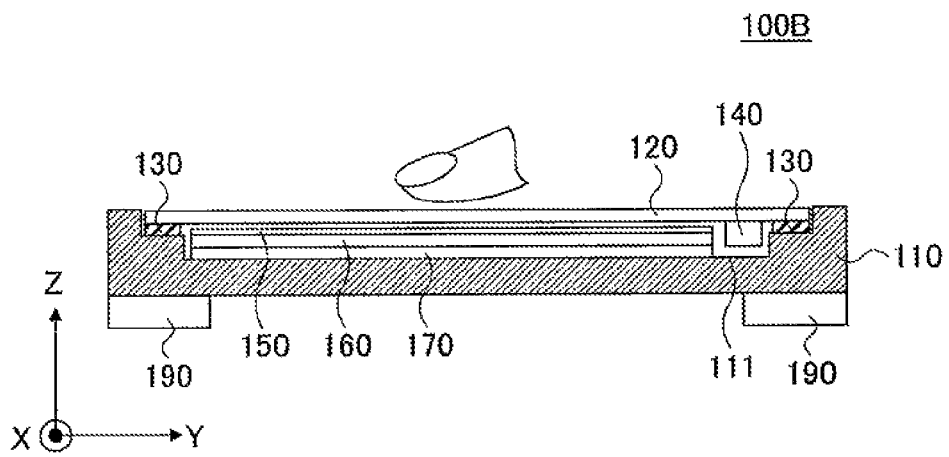
FIG. 14 is a diagram illustrating an educational tactile sensation providing apparatus according to a second variation example of the first embodiment.

FIG. 14 is a diagram illustrating an educational tactile sensation providing apparatus 100B according to a second variation example of the first embodiment.

In the educational tactile sensation providing apparatus 100B, actuators 190 are added to the educational tactile sensation providing apparatus 100 illustrated in FIGS. 1 to 3. Other configurations of the educational tactile sensation providing apparatus 100B are similar to the configurations of the educational tactile sensation providing apparatus 100 illustrated in FIGS. 1 to 3.

The actuators 190 are disposed on a back face side of the housing 110 (negative side in Z axis direction). For example, four actuators 190 are disposed on respective four corners in plan view. For example, the actuators 190 are driven by a driving signal at frequencies in an audible frequency band.

For example, a linear actuator using a servomotor or a stepping motor may be used for the actuator 190. The actuators 190 vibrate the whole of the educational tactile sensation providing apparatus 100B. The audible frequency band is a frequency band about less than 20 kHz. For example, the actuators 190 are driven by a driving signal of several dozen Hz order. It is preferable that such actuators 190 can generate displacement about 100 μm to 1 mm, for example. The drive controlling part 240 or an equivalent drive controlling part may drive the actuators 190.

In this way, when the educational tactile sensation providing apparatus 100B itself vibrates, the vibration in which the natural vibration at the ultrasound-frequency-band by the vibration of the vibrating element 140 and the vibration at the audible frequency band by the actuators 190 are combined can be provided to the user's fingertip touching the top panel 120.

Depending on the feel on a surface of a target tangible object, there may be a case where more realistic tactile sensations can be provided by adding the vibration at the audible frequency band to the vibration of the standing wave caused by the natural vibration at the ultrasound-frequency-band.

In such a case, the educational tactile sensation providing apparatus 100B according to the second variation example is effective.

The actuator 190 does not have to be the linear actuator using the servomotor or the stepping motor. An electric driving element, an oil hydraulic driving element, a pneumatic driving element, a piezoelectric actuator, an artificial muscle or the like may be used.

Figure 15:
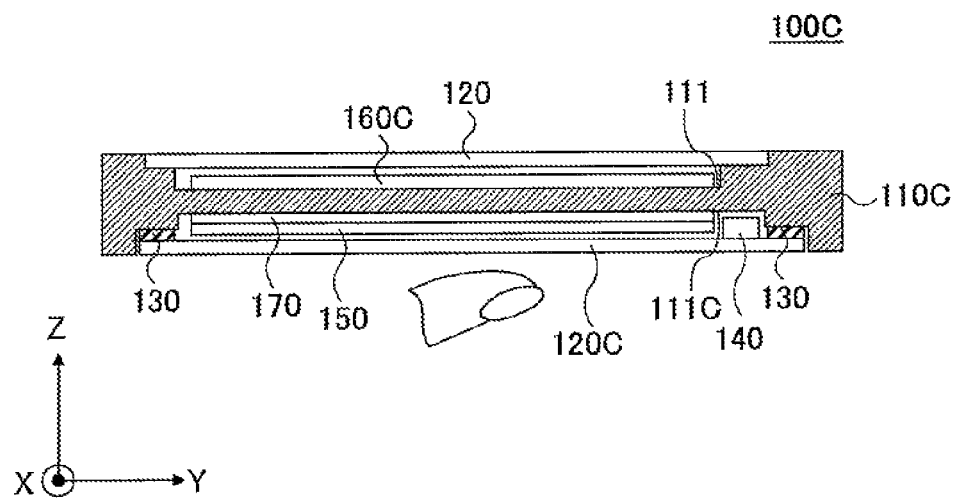
FIG. 15 is a diagram illustrating an educational tactile sensation providing apparatus according to a third variation example of the first embodiment.

FIG. 15 is a diagram illustrating an educational tactile sensation providing apparatus 100C according to a third variation example of the first embodiment. The cross section as illustrated in FIG. 15 corresponds to the cross section taken along the line A-A as illustrated in FIG. 3. In FIG. 15, a XYZ coordinate system, which is a rectangular coordinate system, similar to that illustrated in FIG. 3 is defined.

The educational tactile sensation providing apparatus 100C includes a housing 110C, the top panel 120, a panel 120C, the double-faced adhesive tape 130, the vibrating element 140, the touch panel 150, a display panel 160C, and the substrate 170.

The educational tactile sensation providing apparatus 100C includes a configuration in which the touch panel 150 of the educational tactile sensation providing apparatus 100 illustrated in FIG. 3 is provided on the back face side (negative side in Z axis direction). In comparison with the educational tactile sensation providing apparatus 100 illustrated in FIG. 3, the double-faced adhesive tape 130, the vibrating element 140, the touch panel 150, and the substrate 170 are disposed on the back face side.

A concave portion 111 at a positive side in z axis direction and a concave portion 111C at a negative side in z axis direction are formed on the housing 110C. The display panel 160 is disposed inside of the concave portion 111 and is covered with the top panel 120. The substrate 170 and the touch panel 150 are layered and disposed inside of the concave portion 111C. The panel 120C is secured to the housing 110C with the double-faced adhesive tape 130. The vibrating element 140 is disposed on a positive side surface of the panel 120C in z axis direction.

When the on/off state of the vibrating element 140 is switched to generate the natural vibration at the ultrasound-frequency-band in the panel 120C in accordance with the manipulation input onto the panel 120C in the educational tactile sensation providing apparatus 100C illustrated in FIG. 15, similar to the educational tactile sensation providing apparatus 100 illustrated in FIG. 3, the educational tactile sensation providing apparatus 100C can be provided with which the user can sense exchange of pictorial symbols (goods) displayed on the display panel 160C through the fingertip.

The educational tactile sensation providing apparatus 100C may be used instead of the educational tactile sensation providing apparatus 100 illustrated in FIGS. 1 to 3. FIG. 15 illustrates the educational tactile sensation providing apparatus 100C in which the touch panel 150 is provided on the back face side. However, the touch panels 150 may be provided on both the front face side and the back face side by combining the structure illustrated in FIG. 3 and the structure illustrated in FIG. 15.

Figure 16:
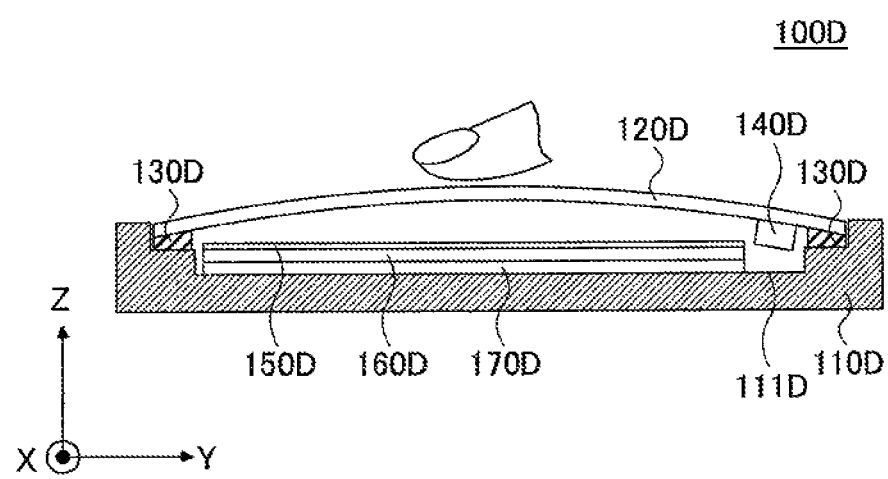
FIG. 16 is a diagram illustrating an operating state of an educational tactile sensation providing apparatus of a fourth variation example according to the first embodiment.

FIG. 16 is a diagram illustrating an operating state of an educational tactile sensation providing apparatus 100D of a fourth variation example according to the first embodiment.

The educational tactile sensation providing apparatus 100D includes a housing 110D, a top panel 120D, a double-faced adhesive tape 130D, a vibrating element 140D, a touch panel 150D, a display panel 160D and a substrate 170D.

The educational tactile sensation providing apparatus 100D illustrated in FIG. 16 has a configuration similar to that of the educational tactile sensation providing apparatus 100 of the first embodiment illustrated in FIG. 3 except for the top panel 120D being a curved glass.

The top panel 120D is curved so that its center portion in plan view protrudes towards a positive side in z axis direction. Although FIG. 16 illustrates a cross-section shape of the top panel 120D in a YZ plane, a cross-section shape in a XZ plane is similar to the cross-section shape in the YZ plane. In particular, it is effective for a case where a surface of a target tangible object is curved.

It is possible to provide the fine tactile sensations by using the top panel 120D of the curved glass. In particular, it is effective for a case where a surface of a target tangible object is curved.

Second Embodiment

FIGS. 17A and 17B are diagrams illustrating a use mode of an educational tactile sensation providing apparatus 100E according to a second embodiment. Between the educational tactile sensation providing apparatus 100E and a tablet computer 600, data transfer can be performed via wireless communication. For example, the wireless communication may be Bluetooth (registered trademark), WiFi, or the like. Instead of the wireless communication, wire communication via a direct cable or data transmission via a transportable recording medium such as a flash memory card can be performed between the educational tactile sensation providing apparatus 100E and the tablet computer 600.

The tablet computer 600 includes a top panel 610, a touch panel 620, and a display panel 630. The tablet computer 600 is a computer that includes the touch panel 620 as a manipulation input part.

At a left side of the display panel 630, the image 510A of the elephant, the image 510B of the dolphin, and the image 510C of the penguin are displayed as candidates for selection.

When the user performs a manipulation input on the top panel 610 to select the image 510A of the elephant, the elephant is displayed on a main area 630A of the display panel 630 as illustrated in FIG. 17A.

When the user transfers the image 510A of the elephant to the educational tactile sensation providing apparatus 100E, the display panel 160 displays the image 510A of the elephant. When the user touches the top panel 120 of the educational tactile sensation providing apparatus 100E to trace the image 510A displayed on the display panel 160, the educational tactile sensation providing apparatus 100E vibrates to provide the tactile sensations as if the user were touching the surface of the elephant with the fingertip. The elephant is an example of a target tangible object.

In this way, even when the user does not touch an actual object, the educational tactile sensation providing apparatus 100E of the second embodiment provides simulated tactile sensations as if the user were touching the actual object when the user touches the top panel 120. The educational tactile sensation providing apparatus 100E is very useful for education for children and education for people with disabilities, for example.

A method for obtaining the tactile sensation data in the second embodiment will be described.

FIGS. 18 and 19 are diagrams that depict procedures to download the tactile sensation data to the tablet computer 600 of the second embodiment.

The tablet computer 600 has a function to communicate with a server via a network. The user downloads application data for causing the tablet computer 600 to function via the network, and stores the data in a memory of the tablet computer 600.

Following procedures may be performed for starting the download. When the application for downloading the tactile sensation data is executed, a download (DL) button 601 is displayed as a GUI button on the main area 630A of the display panel 630 as illustrated in FIG. 18A. The user may manipulate the DL button 601 to execute the download of the tactile sensation data.

FIG. 18B illustrates a state in which 3 kinds of tactile sensation data 641A, 641B and 641C are stored in a memory 640 of the tablet computer 600.

As illustrated in FIG. 18B, the application data includes tactile sensation data on various kinds of creatures. The user may select and download favorite tactile sensation data, and store the data in the memory 640.

FIG. 19 illustrates a situation where tactile sensation data having ID 0011, tactile sensation data having ID 0012, tactile sensation data having ID 0013, and the like are uploaded on the server 700, and the user downloads only necessary tactile sensation data to his or her own tablet computer 600.

In this way, the user may download, to his or her own tablet computer 600, only the tactile sensation data of the target tangible object that the user desires to obtain to sense the tactile sensations at that time.

It is effective to return data except for the latest data to the server 700. The user can transfer the tactile sensation data that the user has stored in the tablet computer 600 to the educational tactile sensation providing apparatus 100E to feel the tactile sensations. In this method, the latest information of the server 700 can be used as appropriate via an application on the web or the like, and unnecessary consumption of the capacity of the memory 640 is prevented.

Third Embodiment

Figure 20:
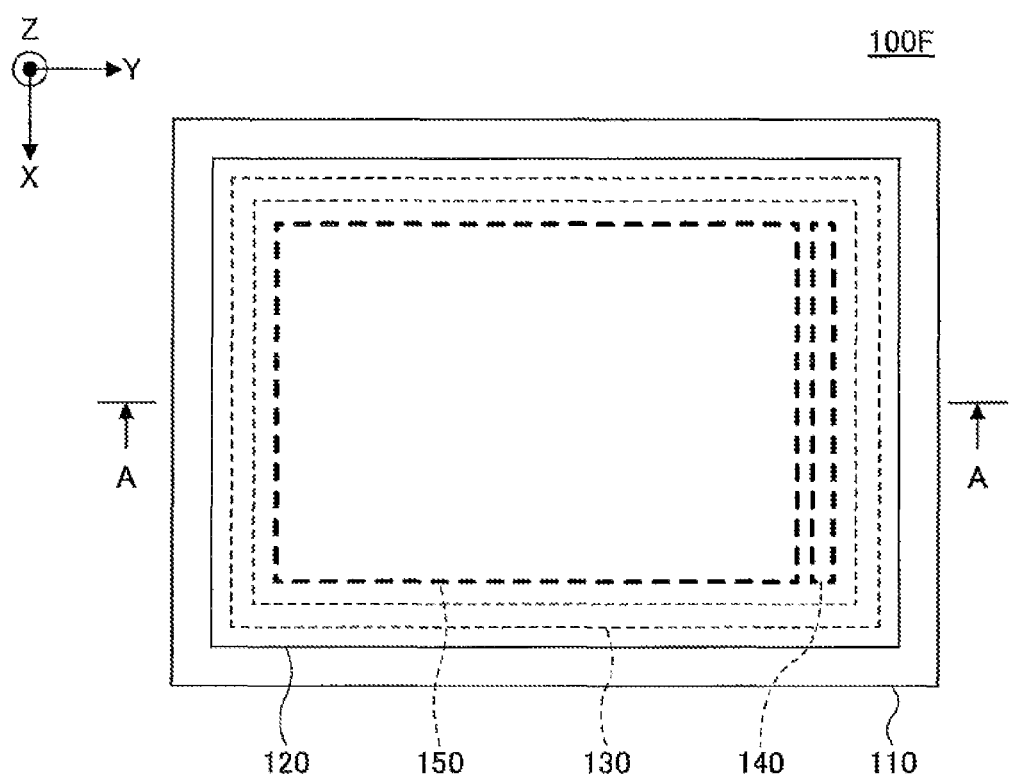
FIG. 20 is a diagram illustrating the educational tactile sensation providing apparatus of a third embodiment in plan view.
Figure 21:
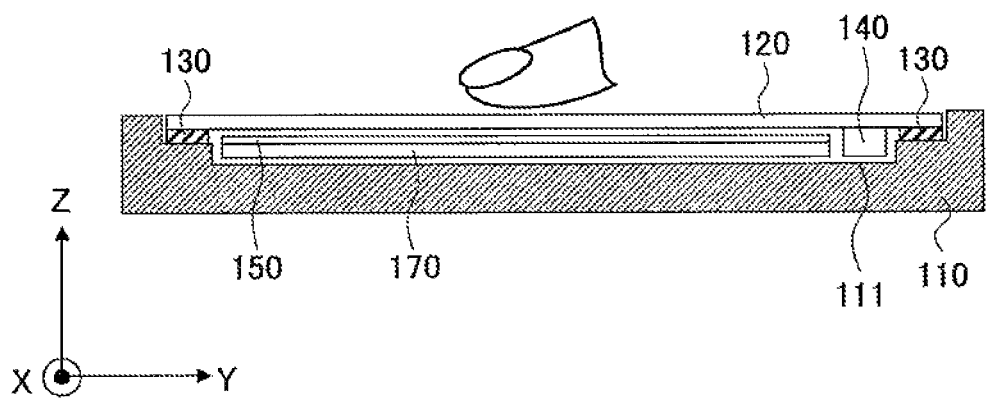
FIG. 21 is a diagram illustrating a cross-sectional view of the educational tactile sensation providing apparatus taken along a line A-A of FIG. 20.

FIG. 20 is a diagram illustrating an educational tactile sensation providing apparatus 100F of a third embodiment in plan view. FIG. 21 is a diagram illustrating a cross-sectional view of the educational tactile sensation providing apparatus 100F taken along a line A-A of FIG. 20. A XYZ coordinate system as an orthogonal coordinate system is defined in FIGS. 20 and 21.

The educational tactile sensation providing apparatus 100F includes the housing 110, the top panel 120, the double-faced adhesive tape 130, the vibrating element 140, the touch panel 150, and the substrate 170. The touch panel 150 is directly mounted on the substrate 170 in the educational tactile sensation providing apparatus 100F. The educational tactile sensation providing apparatus 100F of the third embodiment differs from the educational tactile sensation providing apparatus 100E of the second embodiment in that the educational tactile sensation providing apparatus 100F does not include the display panel 160.

The tactile sensation data (see FIG. 7A) of the educational tactile sensation providing apparatus 100F does not have to include the position data and the coordinate data because the educational tactile sensation providing apparatus 100F does not include the display panel 160 and does not drive the vibrating element 140 in accordance with a manipulation position of the touch panel 150.

When the manipulation input is performed on the top panel 120, the drive controlling part 240 of the educational tactile sensation providing apparatus 100F drives the vibrating element 140 by using a driving signal of an amplitude based on the tactile sensation data input to the educational tactile sensation providing apparatus 100F.

In the third embodiment, the touch panel 150 is provided to detect the manipulation input being performed by the user and a movement of the position of the manipulation input. Accordingly, when the manipulation input is performed on the top panel 120 and it is detected, based on the position data output from the driver IC 151, that the position of the manipulation input moves, the educational tactile sensation providing apparatus 100F uses the amplitude data of the tactile sensation data to drive the vibrating element 140.

For example, in a case where the tactile sensation of the elephant is input to the educational tactile sensation providing apparatus 100F, the vibrating element 140 is driven by a driving signal that reproduces a feel of a skin of the elephant. For example, in a case where it is desired to reproduce only a feel of a skin of an elephant, a dolphin, a penguin or the like with the vibrations, the educational tactile sensation providing apparatus 100F, which does not include the display panel 160 and has a simple configuration, can provide fine tactile sensations to the user.

Because the kinetic friction force applied to the user's fingertip is varied by generating the natural vibration at the ultrasound-frequency-band of the top panel 120, the educational tactile sensation providing apparatus 100F according to the third embodiment can provide the fine tactile sensations to the user. Such an educational tactile sensation providing apparatus 100F is effective for a case where tactile sensations of a surface of a target tangible object are substantially constant.

When the educational tactile sensation providing apparatus 100F is installed at a location where people gather such as a restaurant and a cafe for example, the user can feel the tactile sensations through the educational tactile sensation providing apparatus 100F as if the user were touching the surface of the dolphin even if the actual dolphin (see FIG. 1) is not present at the location.

Figure 22:
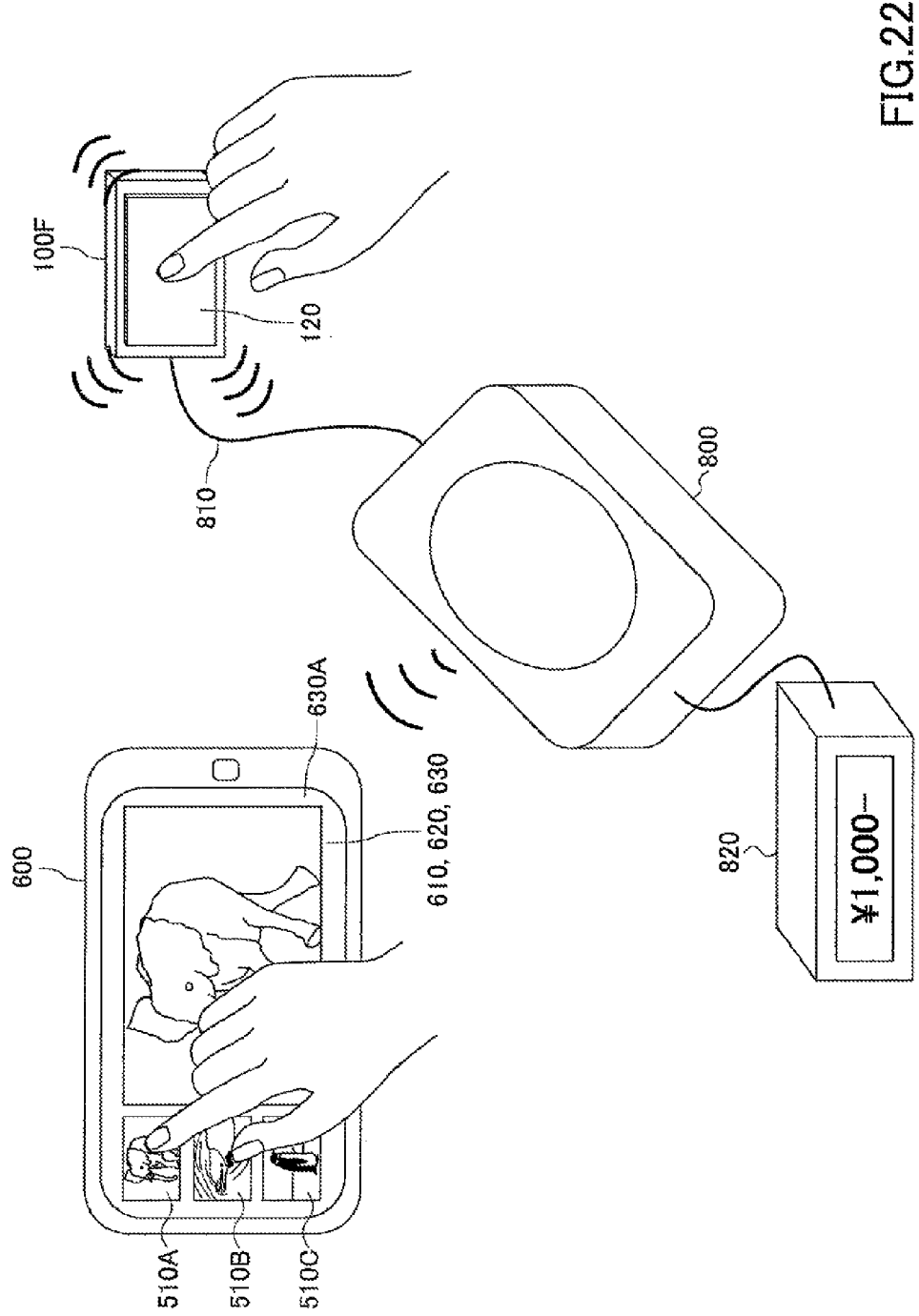
FIG. 22 is a diagram illustrating a use mode of an educational tactile sensation providing apparatus according to the third embodiment.

FIG. 22 is a diagram illustrating a use mode of the educational tactile sensation providing apparatus 100F according to the third embodiment. Between the educational tactile sensation providing apparatus 100F and the tablet computer 600, data transfer can be performed by wireless communication via a short distance wireless communication apparatus 800. The short distance wireless communication apparatus 800 is connected to the educational tactile sensation providing apparatus 100F via a data cable 810.

For example, the wireless communication may be Bluetooth (registered trademark), WiFi, or the like. Instead of the wireless communication, wire communication via a direct cable or data transmission via a transportable recording medium, such as a flash memory card can be performed between the educational tactile sensation providing apparatus 100F and the tablet computer 600.

The tablet computer 600 includes the top panel 610, the touch panel 620, and the display panel 630. The tablet computer 600 is a computer that includes the touch panel 620 as a manipulation input part.

At a left side of the display panel 630, the image 510A of the elephant, the image 510B of the dolphin, and the image 510C of the penguin are displayed as candidates for selection.

When the user performs a manipulation input onto the top panel 610 to select the image 510A of the elephant, the elephant is displayed on the main area 630A of the display panel 630 as illustrated in FIG. 22.

When the user transfers the tactile sensation data of the elephant to the educational tactile sensation providing apparatus 100F via the short distance wireless communication apparatus 800 and touches the top panel 120 of the educational tactile sensation providing apparatus 100F in this state, the educational tactile sensation providing apparatus 100F vibrates to provide the tactile sensations to the user's fingertip as if the user were touching the surface of the elephant. The elephant is an example of a target tangible object. The short distance wireless communication apparatus 800 is an example of an input apparatus.

In this way, even when the user does not touch an actual object, the educational tactile sensation providing apparatus 100F of the third embodiment provides simulated tactile sensations as if the user were touching the actual object when the user touches the top panel 120. The educational tactile sensation providing apparatus 100F is very useful for education for children and education for people with disabilities, for example.

In such a case, charging may be performed in accordance with a data communication amount between the tablet computer 600 and the educational tactile sensation providing apparatus 100F, a number of times of use of the educational tactile sensation providing apparatus 100F, a utilization time of the educational tactile sensation providing apparatus 100F or the like. For example, a usage fee may be charged in accordance with a number of times of use of the short distance wireless communication apparatus 800, a utilization time of the short distance wireless communication apparatus 800 or the like by connecting the short distance wireless communication apparatus 800 to a charging apparatus 820.

The educational tactile sensation providing apparatus 100F may include a sensor that detects contact on the top panel 120 instead of including the touch panel 150. In this case, the sensor detects that the user touches the top panel 120, and the vibrating element 140 is driven. A pressure sensor or the like may be used as the sensor, for example.

In a case where the display panel 160 is not included as described above, a mark may be displayed on the top panel 120, the tactile sensation data may include coordinate data of positions of the mark, and the vibrating element 140 may be driven by using an amplitude in accordance with the position of the manipulation input.

Figure 23:
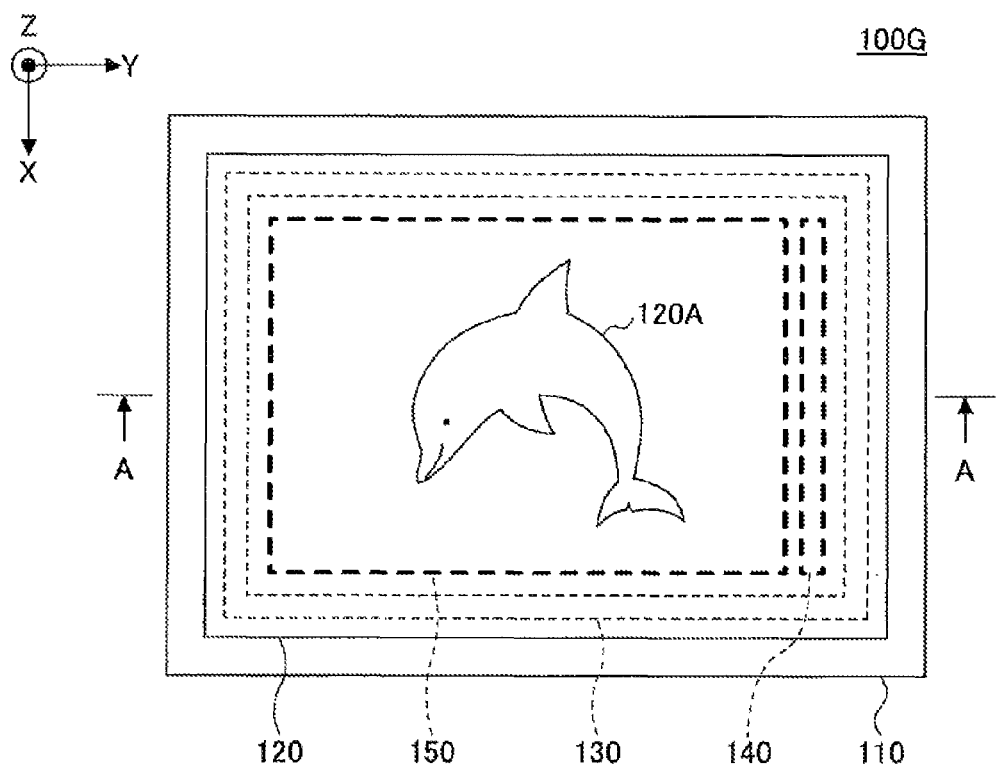
FIG. 23 is a diagram illustrating an educational tactile sensation providing apparatus according to a variation example of the third embodiment.

FIG. 23 is a diagram illustrating an educational tactile sensation providing apparatus 100G according to a variation example of the third embodiment. In the educational tactile sensation providing apparatus 100G, a mark 120A of a dolphin is provided on the top panel 120 of the educational tactile sensation providing apparatus 100F illustrated in FIG. 20. Coordinate data that represents positions of the mark 120A of the dolphin is included in the tactile sensation data.

When the manipulation input is performed within the mark 120A of the dolphin, similar to the educational tactile sensation providing apparatus 100 of the first embodiment, the drive controlling part 240 drives the vibrating element 140 by using a driving signal of an amplitude in accordance with a position of the manipulation input.

Because the kinetic friction force applied to the user's fingertip is varied by generating the natural vibration at the ultrasound-frequency-band of the top panel 120, the educational tactile sensation providing apparatus 100G according to the variation example of the third embodiment can provide the fine tactile sensations to the user.

Although the embodiment is described in which the mark 120A of the dolphin is printed on the surface of the top panel 120, marks (such as marks representing the points A to D in FIGS. 8A and 8B, for example) corresponding to one or more points of an actual surface of a target tangible object may be provided on the surface of the top panel 120.

Various point services, prize services or the like may be performed in accordance with a degree of use. As for an educational use, it can be applied in various scenes, such as education for infants, elementary and junior high school students, elderly, rehabilitation, and people with disabilities.

Although examples of an educational tactile sensation providing apparatus and a system according to the embodiments of the present invention have been described, the present invention is not limited to the embodiments specifically disclosed and various variations and modifications may be made without departing from the scope of the present invention.

All examples and conditional language provided herein are intended for pedagogical purposes of aiding the reader in understanding the invention and the concepts contributed by the inventors to further the art, and are not to be construed as limitation to such specifically recited examples and conditions, nor does the organization of such examples in the specification relate to a showing of superiority and inferiority of the invention. Although one or more embodiments of the present invention have been described in detail, it should be understood that various changes, substitutions, and alterations could be made hereto without departing from the sprit and scope of the invention.

What is claimed is:

1. An educational tactile sensation providing apparatus for providing simulated tactile sensations of a target tangible object, the educational tactile sensation providing apparatus comprising:
    a top panel having a manipulation input surface;
    a position detector configured to detect a position of a manipulation input performed on the manipulation input surface to output a signal in accordance with the manipulation input;
    a display part disposed on a back face side of the top panel;
    a vibrating element configured to generate a vibration in the manipulation input surface of the top panel;
    a memory configured to store tactile sensation data in which an image of the target tangible object is associated with positions in the image and amplitudes corresponding to the tactile sensations of the target tangible object at the respective positions;
    an amplitude modulator configured to modulate an amplitude of a wave signal in an ultrasound-frequency-band in accordance with amplitude data and to output the modulated wave signal as a driving signal to the vibrating element, the driving signal being used for driving the vibrating element, the wave signal generating a natural vibration in the ultrasound-frequency-band in the manipulation input surface, the amplitude data representing an amplitude of the driving signal; and
    a drive controlling part configured to output the amplitude data used for modulating the amplitude of the wave signal to the amplitude modulator and to drive the vibrating element in response to the amplitude data, the drive controlling part being configured to adjust the amplitude data based on the position of the manipulation input performed on the manipulation input surface and a position among the positions in the image included in the tactile sensation data.

2. The educational tactile sensation providing apparatus as claimed in claim 1, wherein the drive controlling part drives the vibrating element so that an intensity of the natural vibration varies in accordance with the position of the manipulation input and a temporal change degree of the position of the manipulation input performed on the manipulation input surface.

3. The educational tactile sensation providing apparatus as claimed in claim 1, further comprising:
    a temperature adjusting element configured to adjust a temperature of the manipulation input surface.

4. The educational tactile sensation providing apparatus as claimed in claim 1, further comprising:
    a second vibrating element configured to generate a vibration at an audible frequency in the manipulation input surface.

5. The educational tactile sensation providing apparatus as claimed in claim 1, wherein the tactile sensation data stored in the memory is input from a mobile terminal connected through a wired or wireless connection.

6. A system comprising:
    a mobile terminal; and
    a server configured to perform communication with the mobile terminal,
    wherein the server transmits, to the mobile terminal, tactile sensation data of a target tangible object in response to a request from the mobile terminal, and
    wherein the mobile terminal inputs the tactile sensation data received from the server to the educational tactile sensation providing apparatus as claimed in claim 1.

7. The educational tactile sensation providing apparatus as claimed in claim 1,
    wherein the top panel has a back surface opposite to the manipulation input surface, and
    wherein the vibrating element is disposed on the back surface of the top panel and has a planar area smaller than that of the top panel.

8. An educational tactile sensation providing apparatus for providing simulated tactile sensations of a target tangible object, the educational tactile sensation providing apparatus comprising:
    a top panel having a manipulation input surface;
    a position detector configured to detect a position of a manipulation input performed on the manipulation input surface to output a signal in accordance with the manipulation input;
    a vibrating element configured to generate a vibration in the manipulation input surface of the top panel;
    a memory configured to store tactile sensation data in which positions in the manipulation input surface are associated with amplitudes corresponding to the tactile sensations of the target tangible object at the respective positions;
    an amplitude modulator configured to modulate an amplitude of a wave signal in an ultrasound-frequency-band in accordance with amplitude data and to output the modulated wave signal as a driving signal to the vibrating element, the driving signal being used for driving the vibrating element, the wave signal generating a natural vibration in the ultrasound-frequency-band in the manipulation input surface, the amplitude data representing an amplitude of the driving signal; and a drive controlling part configured to output the amplitude data used for modulating the amplitude of the wave signal to the amplitude modulator and to drive the vibrating element in response to the amplitude data, the drive controlling part being configured to adjust the amplitude data based on the position of the manipulation input performed on the manipulation input surface and a position among the positions in the manipulation input surface included in the tactile sensation data.

9. The educational tactile sensation providing apparatus as claimed in claim 8, wherein a mark that represents a position of the target tangible object is provided on the manipulation input surface.

10. The educational tactile sensation providing apparatus as claimed in claim 8,
   wherein the top panel has a back surface opposite to the manipulation input surface, and
   wherein the vibrating element is disposed on the back surface of the top panel and has a planar area smaller than that of the top panel.

11. An educational tactile sensation providing apparatus for providing a simulated tactile sensation of a surface of a target tangible object, the educational tactile sensation providing apparatus comprising:
   a vibrating element configured to generate a vibration in a manipulation input surface on which a manipulation input is performed by a user;
   a memory configured to store tactile sensation data that represents an amplitude corresponding to the tactile sensation of the surface of the target tangible object;
   an amplitude modulator configured to modulate an amplitude of a wave signal in an ultrasound-frequency-band in accordance with amplitude data and to output the modulated wave signal as a driving signal to the vibrating element, the driving signal being used for driving the vibrating element, the wave signal generating a natural vibration in the ultrasound-frequency-band in the manipulation input surface, the amplitude data representing an amplitude of the driving signal; and
   a drive controlling part configured to output the amplitude data used for modulating the amplitude of the wave signal to the amplitude modulator and to drive the vibrating element in response to the amplitude data, the drive controlling part being configured to adjust the amplitude of the driving signal to the amplitude represented by the tactile sensation data when the manipulation input is performed on the manipulation input surface by the user.

12. The educational tactile sensation providing apparatus as claimed in claim 11, wherein the vibrating element has a planar area smaller than that of the manipulation input surface.

* * * * *